United States Patent [19]
Le Pennec et al.

[11] Patent Number: 5,524,111
[45] Date of Patent: Jun. 4, 1996

[54] METHOD AND APPARATUS FOR TRANSMITTING AN UNIQUE HIGH RATE DIGITAL DATA FLOW OVER N MULTIPLE DIFFERENT INDEPENDENT DIGITAL COMMUNICATION CHANNELS BETWEEN TWO DIFFERENT PRIMARY TERMINAL ADAPTERS

[75] Inventors: Jean-Francois Le Pennec, Nice; Patrick Michel, La Gaude; Patrick Sicsic, La Colle Sur Loup; Joseph Spatari, Cagnes Sur Mer, all of France

[73] Assignee: International Business Machines Corporation, Armonk, N.Y.

[21] Appl. No.: 192,516

[22] Filed: Feb. 7, 1994

[30] Foreign Application Priority Data

Mar. 2, 1993 [EP] European Pat. Off. .............. 93480016

[51] Int. Cl.⁶ .................................................. H04L 12/20
[52] U.S. Cl. ........................... 370/84; 370/112; 375/260; 375/267
[58] Field of Search ........................ 370/60, 60.1, 94.1, 370/94.2, 110.1, 84, 95.1, 95.3, 112; 375/37, 38, 260, 267

[56] References Cited

U.S. PATENT DOCUMENTS

| 5,029,163 | 7/1991 | Chao et al. | 370/95.1 |
| 5,050,166 | 9/1991 | Cantoni et al. | 370/95.1 |
| 5,058,133 | 10/1991 | Duncanson et al. | 375/38 |
| 5,184,348 | 2/1993 | Abdelmouttalib et al. | 370/95.1 |

FOREIGN PATENT DOCUMENTS

| 0156339 | 10/1985 | European Pat. Off. . |
| 0414950 | 3/1991 | European Pat. Off. . |
| 2634082 | 1/1990 | France . |
| 3726359 | 2/1989 | Germany . |

Primary Examiner—Wellington Chin
Attorney, Agent, or Firm—Joscelyn G. Cockburn

[57] ABSTRACT

Method for transmitting a unique high-rate digital data flow over n multiple different independent digital communication channels between two different primary terminal adapters. The method involves the steps of establishing, on request of a first DTE to a second remote DTE, a set of n independent digital communication channels between said terminal adapters and determining, during an initialization phase, the relationship between the slot of each channel used for the building of an aggregation superchannel and the chronologic order of the establishment of the considered slot. Then, the high-rate digital data flow is separated into bytes and each byte is transmitted through the independent digital channels in accordance with the chronologic order which was previously assigned to each of the said channels. In the remote DTE, each byte of the separated high-rate data flow is received through the different independent digital channel and is loaded in a single memory at an address which is computed from the following formula:

$$A(n)=A(n-1)+n$$

Where A(n−1) corresponds to the address in which the preceding byte conveyed through the considered channel is stored, and n corresponds to the number of digital channels established. Therefore, each channel works independently and there is no need to measure any delay between the channels. The memory storage will contain at continuous addresses the high-rate data flow. Applied to an ISDN, fractional T1 or multi-channel E1, the method provides an aggregate link operating a nx64 kpbs.

13 Claims, 22 Drawing Sheets

FIG. 8A
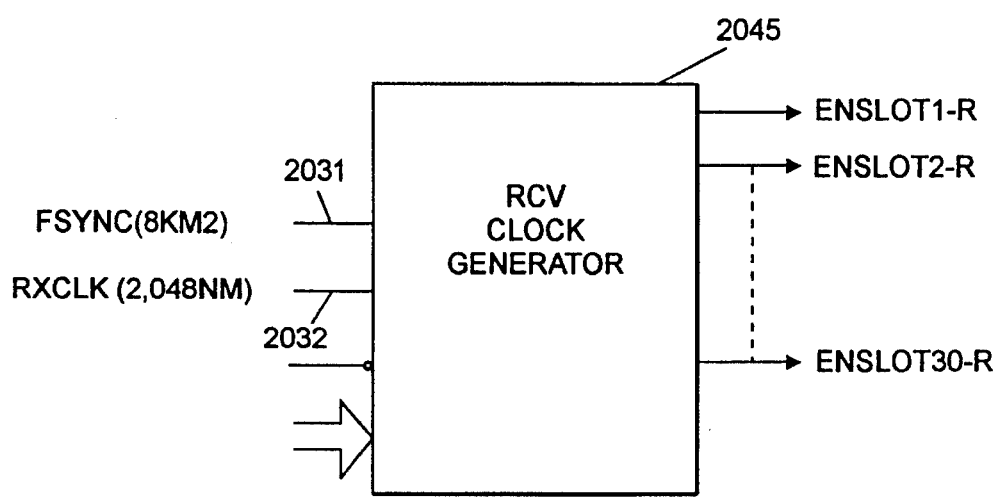
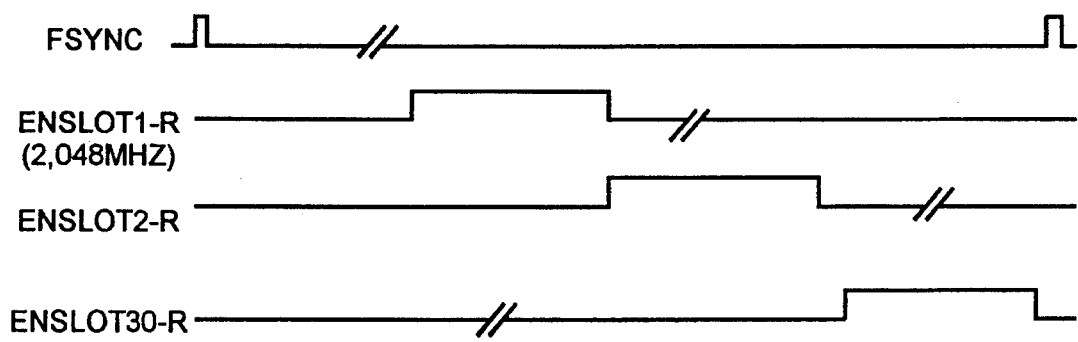
FIG. 8B

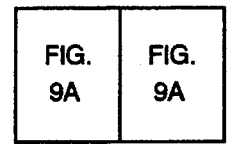
FIG. 9
FIG. 9B
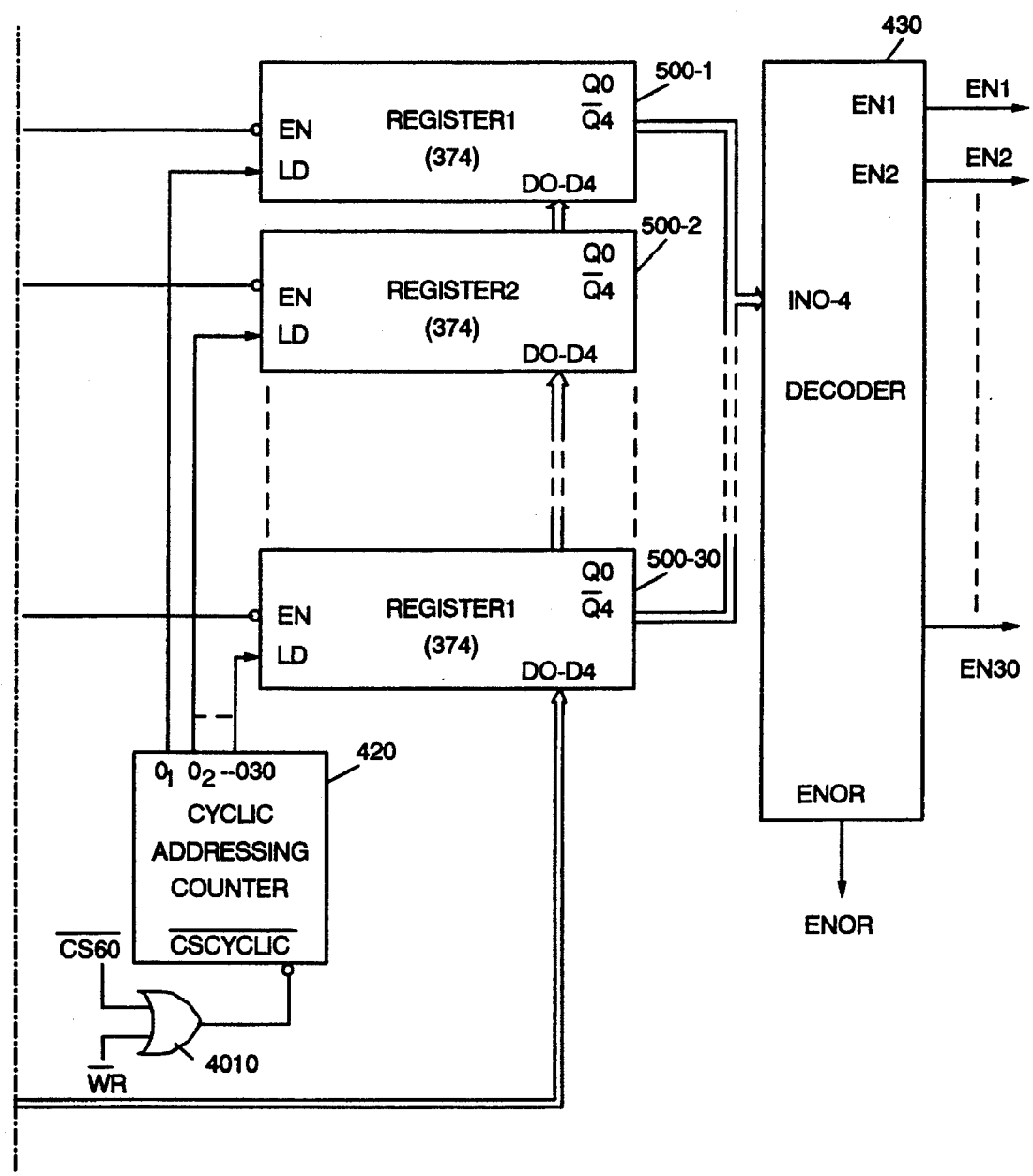

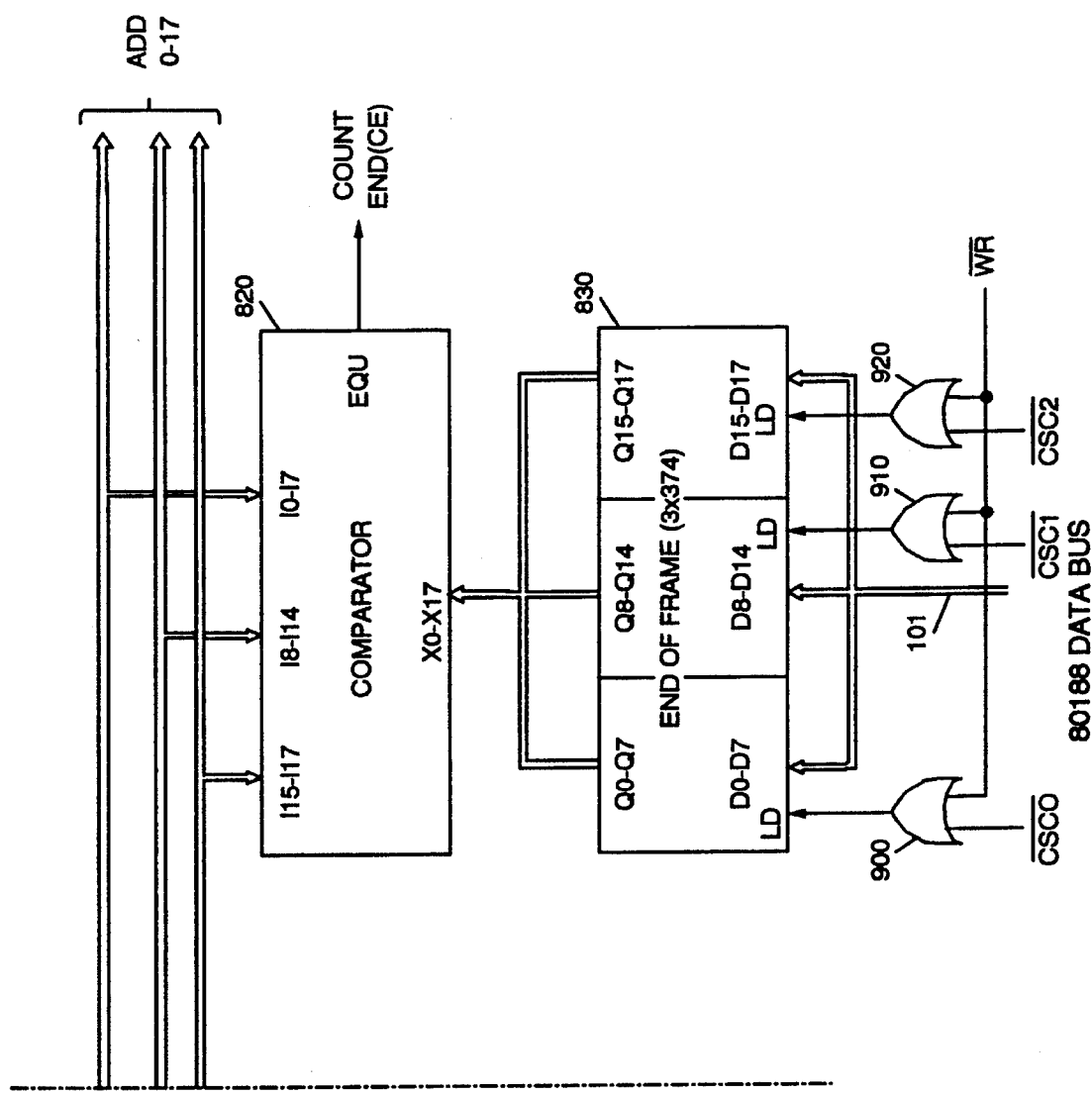

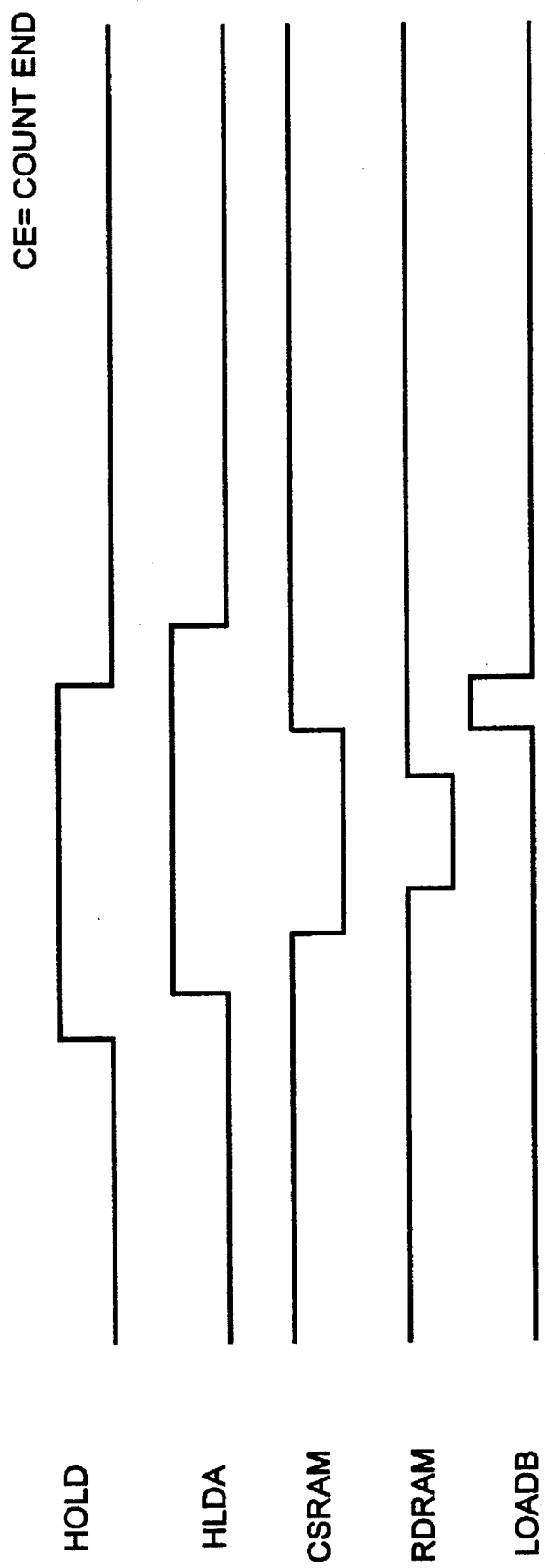

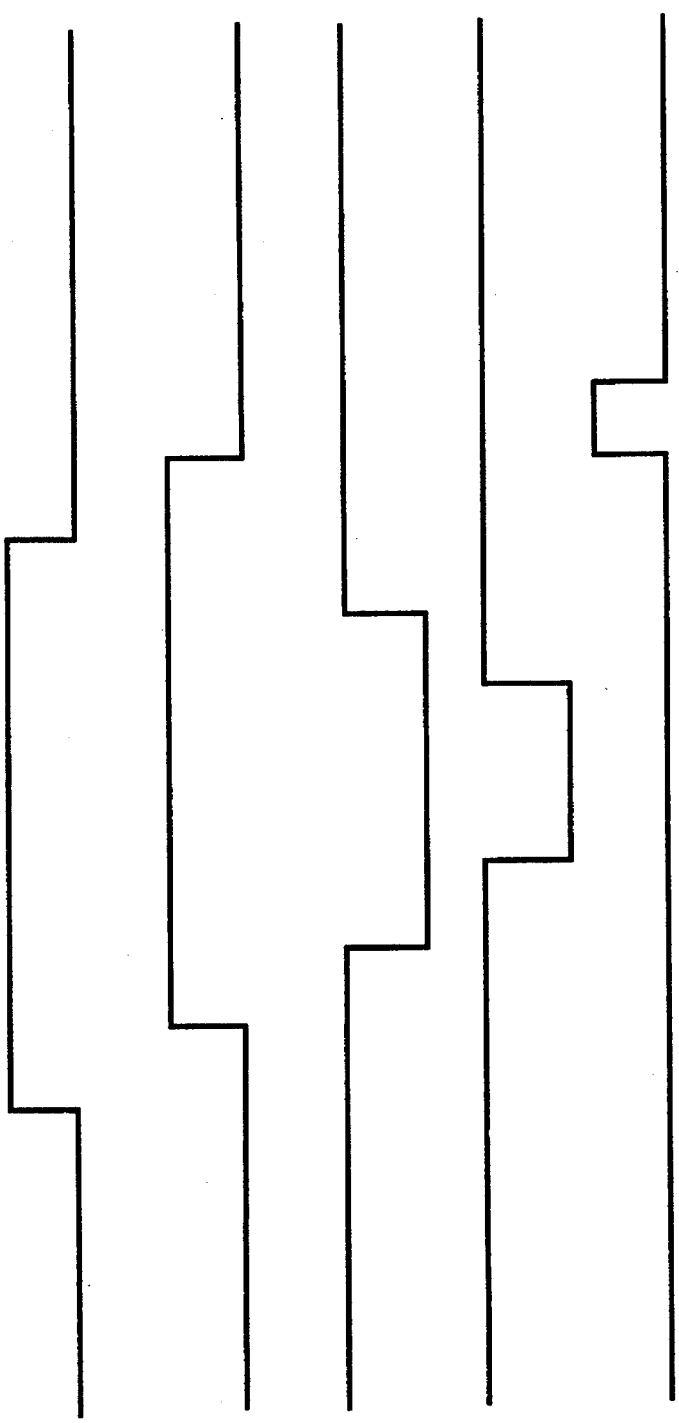

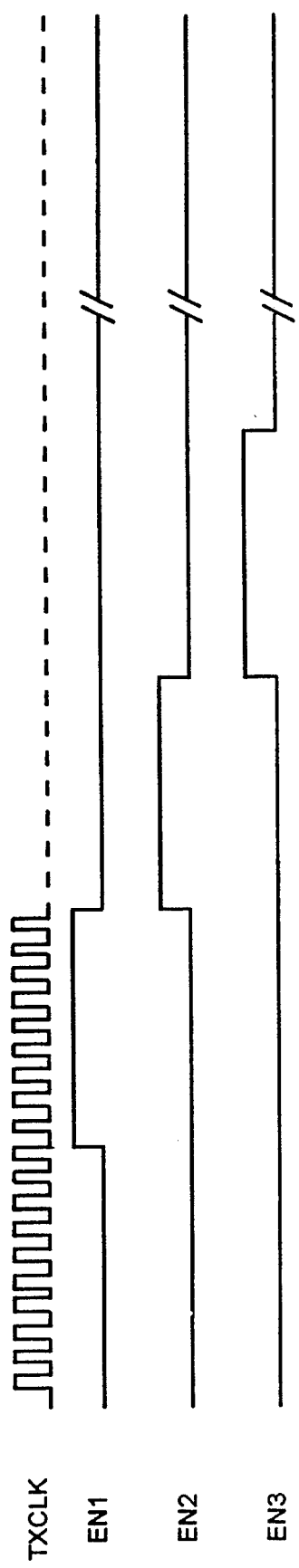

METHOD AND APPARATUS FOR TRANSMITTING AN UNIQUE HIGH RATE DIGITAL DATA FLOW OVER N MULTIPLE DIFFERENT INDEPENDENT DIGITAL COMMUNICATION CHANNELS BETWEEN TWO DIFFERENT PRIMARY TERMINAL ADAPTERS

TECHNICAL FIELD OF THE INVENTION

The invention relates to the telecommunication field and more particularly to a method for transmitting a high-rate digital data flow over n separate independent digital communication channels.

BACKGROUND ART

Integrated Services Digital Network (I.S.D.N) is an international communications standard that makes it possible to deliver multiple services in addition to the normal telephone (voice) service and change consequently, fax, video, data and all kinds of images can be transmitted to a terminal over a single line. The ISDN is provided by public network operators at both national and international levels which offer a choice of Basic or Primary Rate access to the ISDN network. The basic access (also called 2B+D) provides two 64 kbps channels for voice or data communications plus one extra D channel for the controlling and the monitoring of the transmission, giving an aggregate speed of 144 Kbps. The primary rate (which is called 30B+D) offers up to 30 simultaneous 64 Kbps B-channels and one 64 kbps D channel for an aggregate speed of 2,048 Kbps (referred to as E1) or 23 simultaneous 64 Kbps B channels and one 64 Kbps D channel for an aggregate speed of 1,53 Kbps in the case of a T1 primary channel.

The performances offered by the ISDN networks, and particularly the speed provided by the primary rate will allow the development of powerful and effective multimedia applications in which data, images and voice will be processed. However, in order to ensure that a maximum number of different software applications take advantage of the substantial performances of the ISDN networks, it is highly desirable that multiple different telecommunication links having a wide range of different speeds be provided.

European patent application Number 91480136.0 entitled "Apparatus for connecting a communicating equipment to a digital communication network having at least two digital communication channels" filed on Aug. 29th 1991, not published at the date of filing of the present patent application and assigned to the assignee of the present application discloses an apparatus providing the aggregation of two B-channels in order to provide a single 144 kbps channel which is fully transparent to the application. However, in this system it remains necessary to measure the delay which exists between the different channels forming the required aggregate channel. Therefore, in view of the different possible requirements which are likely to exist, it is highly desirable to provide the aggregation of a subset of the 30 B-channel existing in the ISDN primary frame in order to provide one link having a predetermined speed of 64 Kbps, 128 Kbps, 192 Kbps, etc . . . In addition, it is desirable to provide a fractional T1 or multi-channel E1 (according to I431 CCITT recommendations) at a rate of nx64 Kbps, with n being equal to 1, 2, 3, 4, etc . . .

SUMMARY OF THE INVENTION

The problem to be solved by the present invention is to provide an apparatus which permits the simultaneous use of n different B channels, each operating at 64 kpbs, in order to get a single high-rate digital channel running at nx64 kpbs which is transparent to the user and independent of the protocol which is used.

This problem is solved by the method and the apparatus according to the present invention which provides an effective way to transmit an unique high-rate digital data flow over n separate independent digital communication channels. In accordance with the present invention, the method involves the steps of establishing on request of a first DTE to a second remote DTE a set of n independent digital commnunication channels between said terminal adapters, and determining during an initialization phase the relationship between the slot of each channel used for the building of said aggregation superchannel and the chronologic order of the establishment of the considered slot. Then, the high-rate data flow is split into bytes and each byte is transmitted through the independent digital channels in accordance with the chronologic Order which was previously assigned to each of the said channels. In the remote DTE, each byte of the split high-rate data flow is received through the different independent digital channels and are loaded in a single memory at an address which is computed from the following formula:

$$A(n)=A(n-1)+n$$

Where $A(n-1)$ corresponds to the address in which the preceding byte, conveyed through the considered channel, is stored and n corresponds to the number of digital channels established.

Therefore, each channel works independently and there is no need to measure any delay between the channels. The memory storage will contain at continuous addresses the high-rate data flow. In a preferred embodiment of the invention, the method involves an initialization procedure during which each of the two DTE exchange synchronization frames, each frame consisting in one synchronization byte separated by two HDLC flags.

This apparatus may provide several high-rate channels as long as B channels are available. As the mechanism remains the same, only the way to get the single high rate channel is described.

Preferably, the method is applied to an ISDN, a fractional T1 or a multi-channel E1 in order to provide an aggregate digital link operating at nx64 kbps.

DESCRIPTION OF THE DRAWINGS

FIGS. 8A and 8B illustrate the timing generation process which is involved in the Receive part of the machine.

FIG. 14 is timing signals illustrating the operations involved in the Matrix switching circuit.

DESCRIPTION OF THE PREFERRED EMBODIMENT OF THE INVENTION

Figure 1:
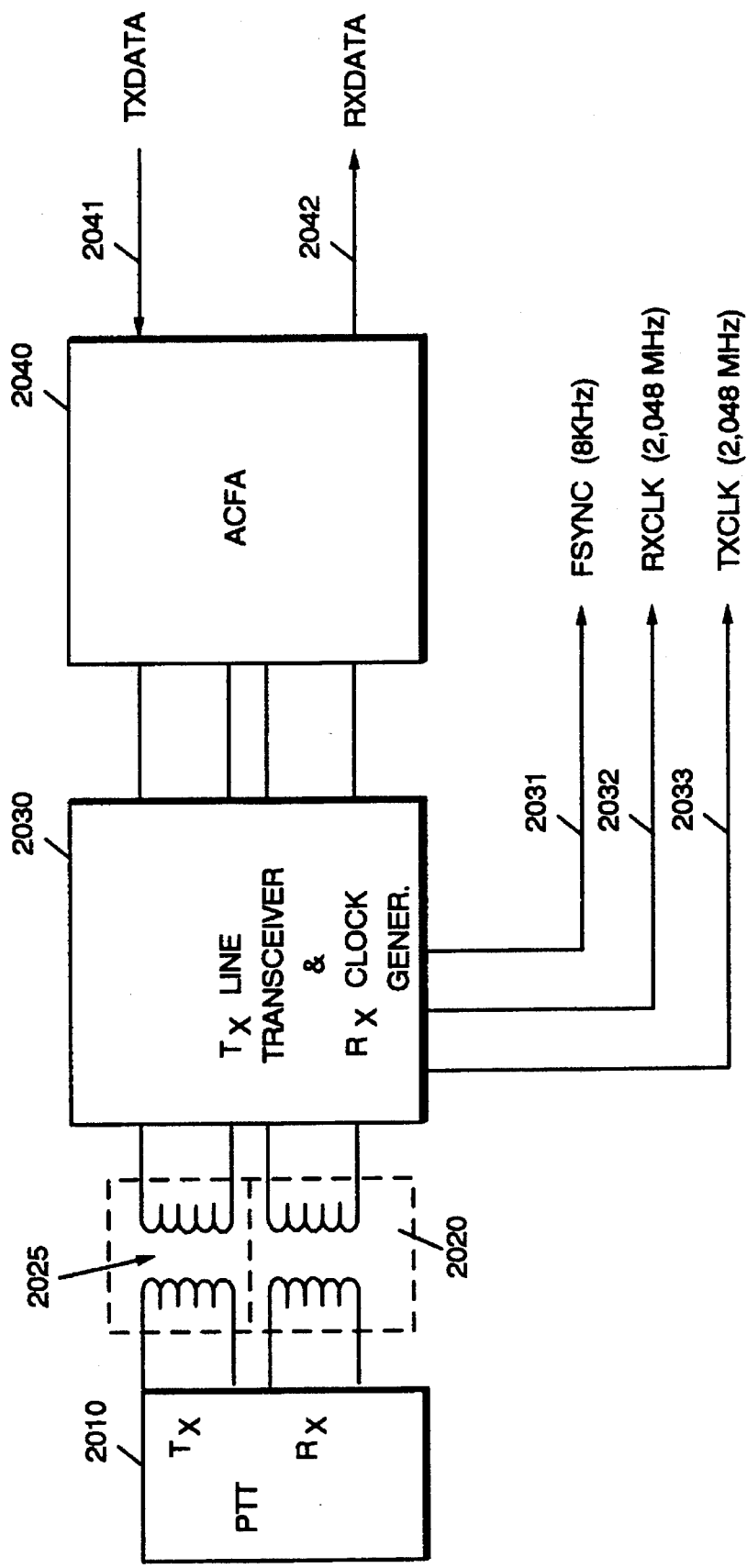
FIG. 1 illustrates the attachment to the Network Termination (NT) as described in the above mentioned CCITT recommendations.
Figure 2:
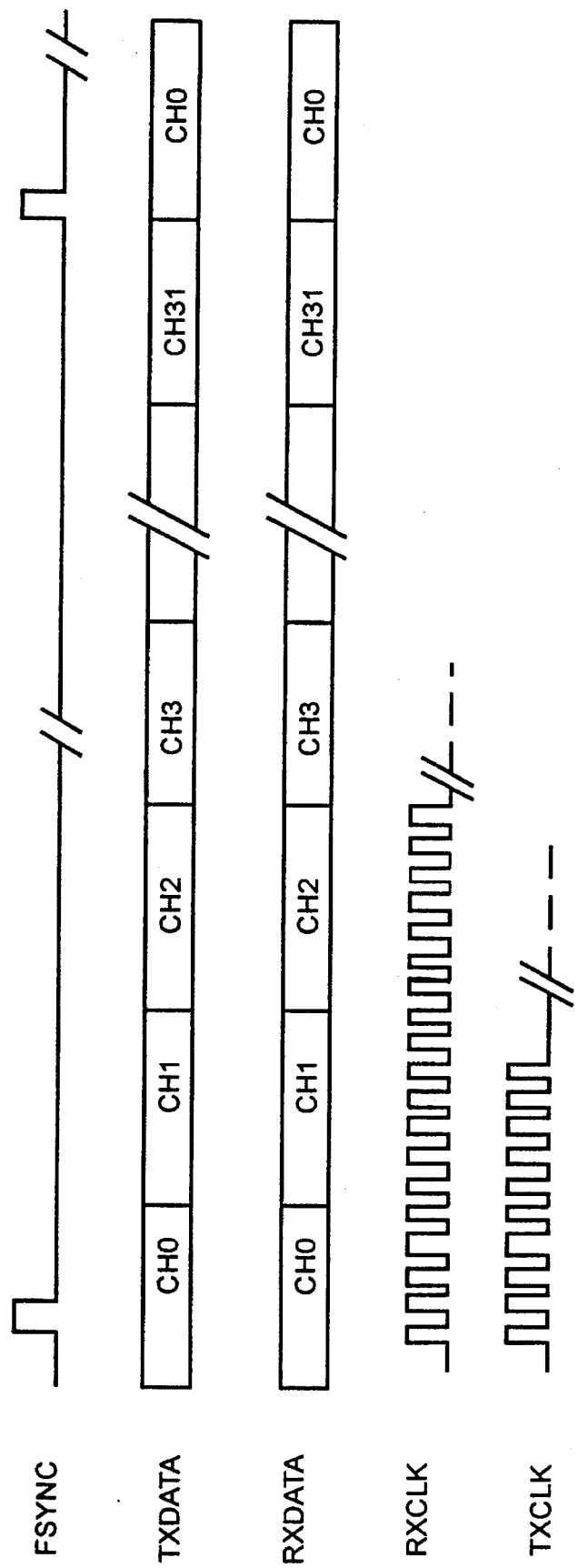
FIG. 2 shows an illustration of the clock signals and the Transmitted (TxData) and received (RxData) data existing in the analog interface.

FIG. 1 illustrates the attachment to the Network Termination (NT) as described in the above mentioned CCITT recommendations. There is shown a plug device 2010 allowing the attachment to the ISDN primary rate interface which is connected to a line transceiver and clock generation module via two line transformers 2020 and 2025, respectively designed for the transmit and the receive pair. Module 2030 extracts from the analog HDB3 signals on the lines a set of three different clocks signals, namely a Frame Synchro Signal (FSYNC) clock signal 2031 at 8 kbps, a Rxclock clock signal 2032 operating at 2.048 MHz and a TxClk clock signal 2033 also at 2.048 MHz. Module 2030 communicates via 2 distinctive HDB3 2-leads channels to an Advance CMOS Frame Aligner (ACFA) 2040 manufactured by SIEMENS under the reference part number PEB-2035. As known by the skilled man, ACFA module 2040 particularly manages the signalization with the Network Terminator (NT) which uses the slot 0. It should be noticed that other equivalent specialized chips could be used by a skilled man and that the ACFA 2040 provides an output RxData signal 2042, and a second output TxData signal 2041. Typical timing diagrams of the above different signal clocks, i.e. particularly the Transmitted (TxData) and received (RxData) signals, are shown in the FIG. 2.

Figure 3A:
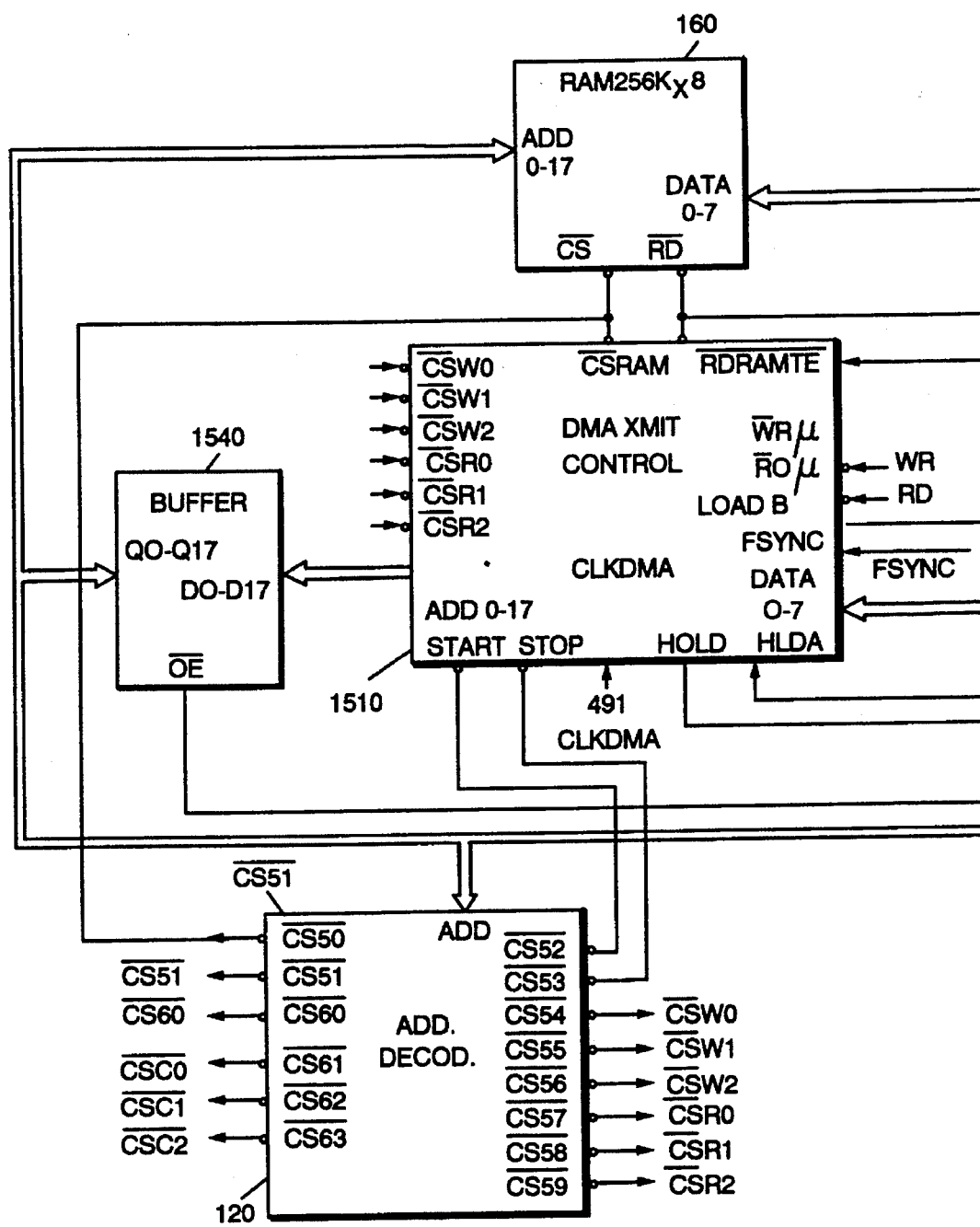
FIG. 3, consisting of FIGS. 3A and 3B, shows a basic view of the Transmit part of the apparatus according to the invention.
Figures 3, 3B:
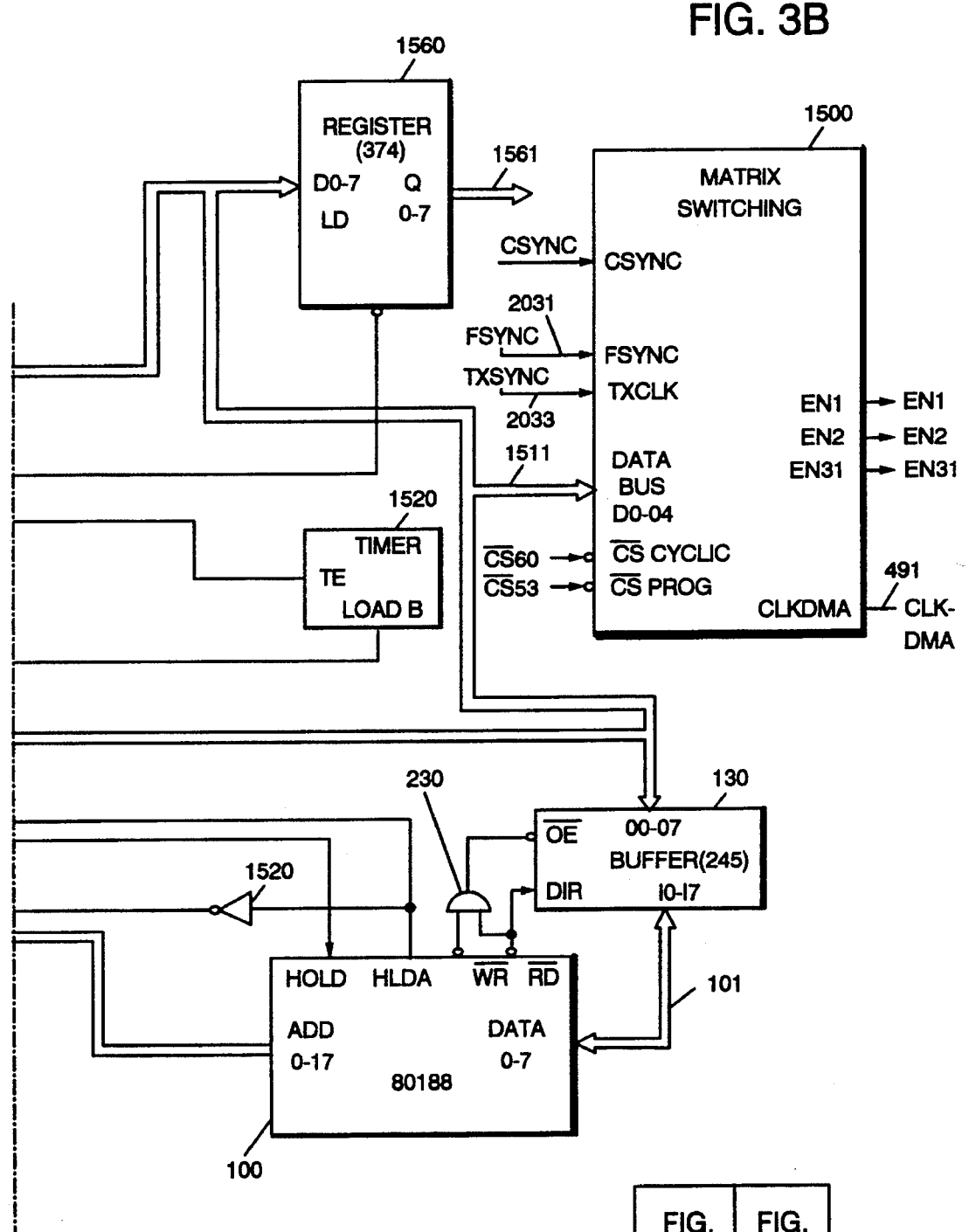

FIG. 3 shows a basic view of the Transmit part of the apparatus according to the invention. A processor 100, being of the type INTEL 80188, associated with some PROM storage, not shown in FIG. 3, is used for the generation of the different chip select and control signals which are needed in the machine. This is achieved by means of an Address Decoder 120 which is accessed by Processor 100 via its address bus. A static RAM storage 160, being 256Kx8 large, can be accessed by processor 100 through a buffer 1540 for the address bus. Similarly, a buffer 130 is used for accessing RAM storage 160 by processor 100 via a bus 1511 which is also connected to a DMA transmit control 1510 which manage the direct access of memory 160 for the transmit part of the machine.

A timer 1520, which will be particularly described hereinafter with further details, generates a TIMER ELAPSED (TE) signal which is transmitted to the DMA Xmit Control 1510. TIMER ELAPSED signal is derived from the TxClk clock signal 2033, FSYNC clock signal 2031, and also from a LOAD B signal which is generated by DMA XMIT control circuit 1510. Bus 1511 which comes from buffer 130 also accesses a register 1560 having an output bus 1561 which is connected to a set of 30 modules which will be described in greater details with respect to FIG. 5. At last, the 5 least significant bits (LSB) of bus 1511 are transmitted to a Matrix Switching element 1500 which internal structure will be described hereinafter with respect to FIG. 9.

Figure 4A:
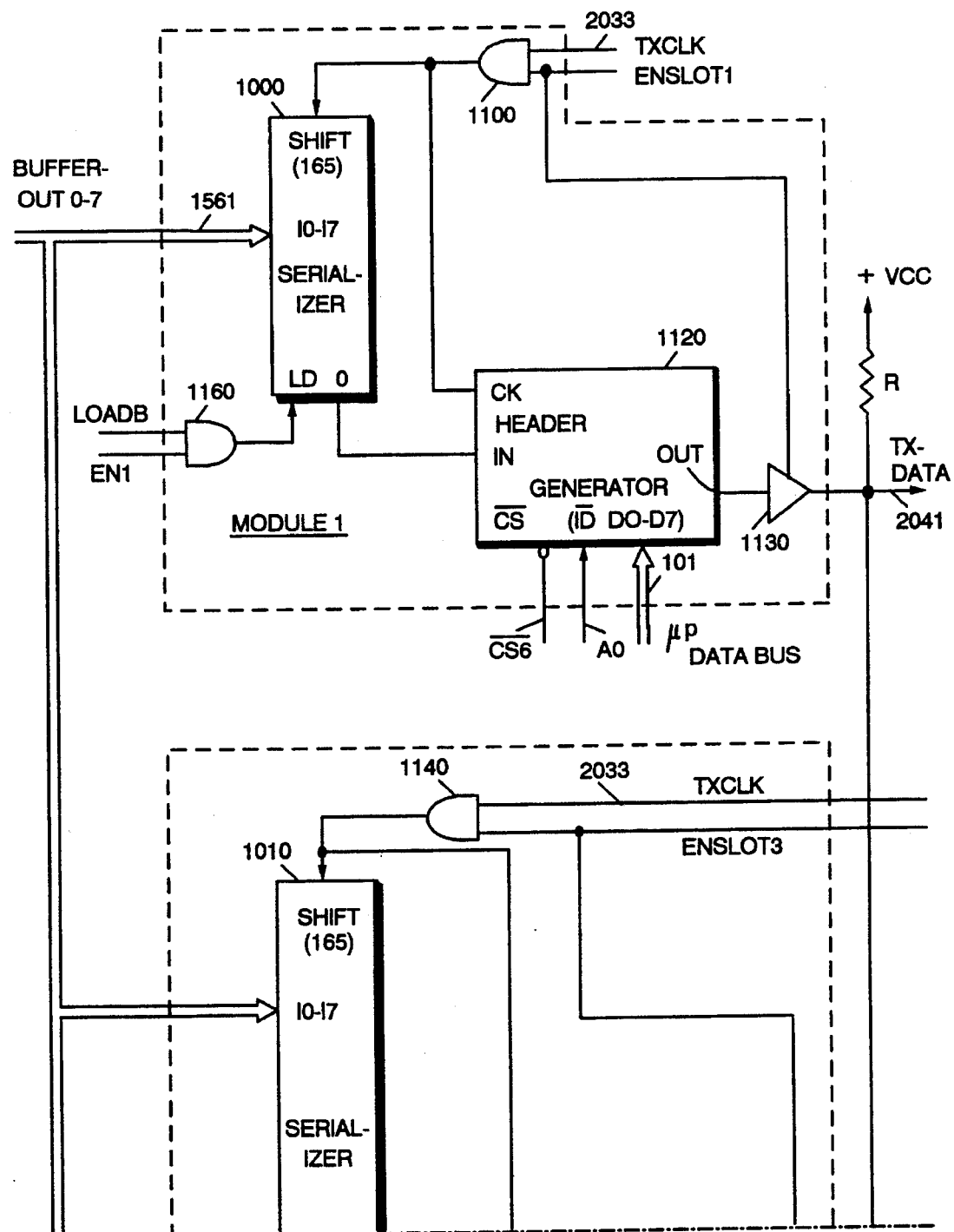
FIG. 4, consisting of FIGS. 4A and 4B, shows the set of 30 modules which are needed in the Tx buffering element.
Figure 4B:
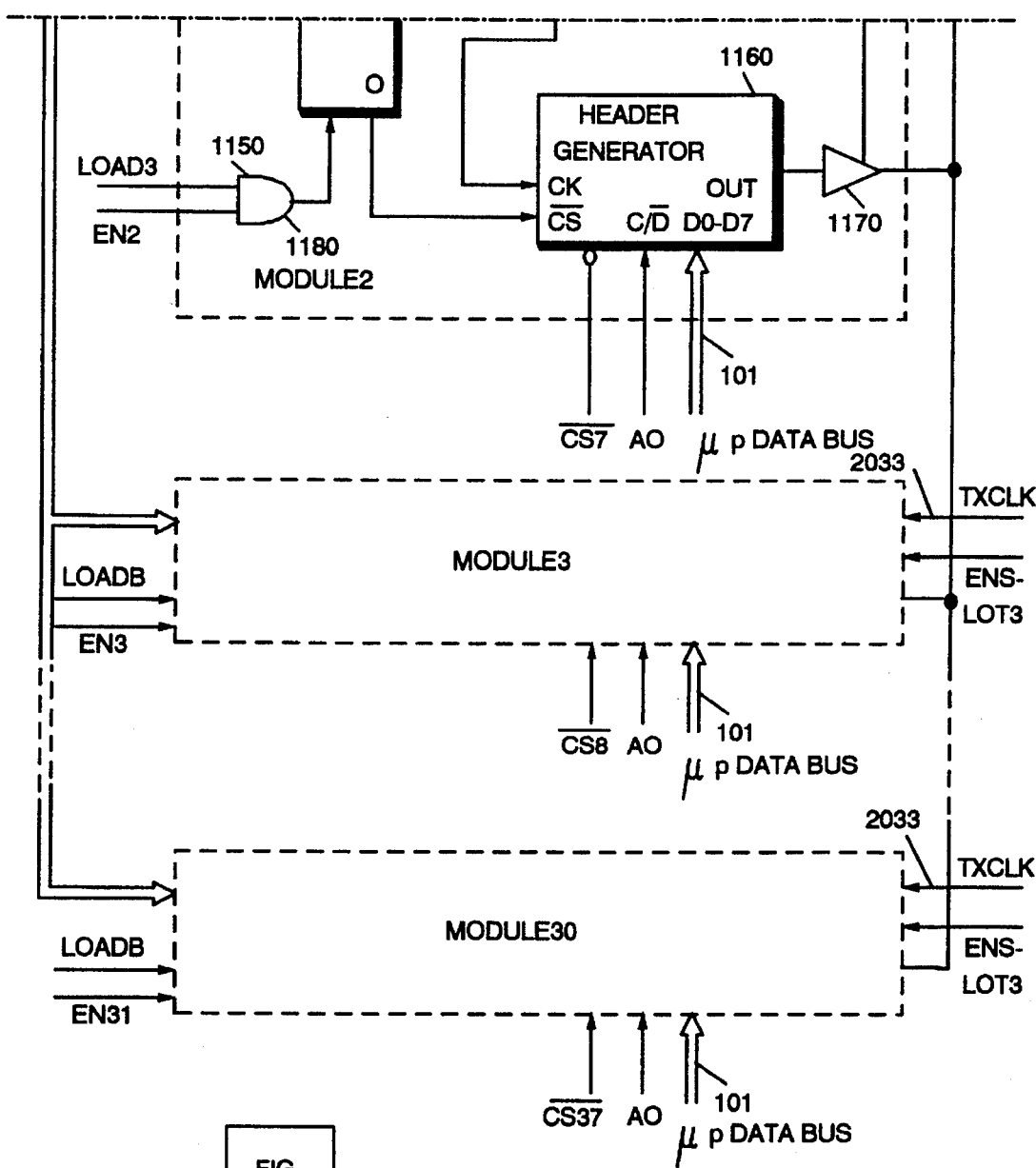

FIG. 4 details the arrangement of the set of 30 modules which are included in the Tx buffering above and which are needed in the Tx part of the apparatus. The figure particularly shows details of the basic structure of two distinctive modules but it should be understood that the remaining 28 modules are made in a similar way. A first module, hereinafter referred to as module 1, receives the output of buffer 1560 via bus 1561. Bus 1561 is connected to the input of a serializer 1000, of the type 74165 for instance, which parallel loading is controlled by a positive output of an AND gate 1160, which inputs lead respectively receives En1 and LOADB control signals which generated by MATRIX SWITCHING circuit 1500 and DMA Xmit control circuit 1510. The shifting of Serializer 1000 is controlled by a control signal which is generated at the output of an AND gate 1100 respectively receiving TxClk signal 2033 from PRACT 2030 and and ENSLOT1 signal from a TxClk generator 2000. Module 1 also comprises a header generator 1120 which can be programmed by processor 100 through its D0–D7 data bus 101, and chip select control signal CS6 generated by ADDRESS DECODER 120. Header generator 1120 is further controlled by a COMMAND/DATA (C/D) control lead connected to the least significant bit of Address bus of processor 100 which is used for indicating the header generator that the data existing on data bus 101 carries a programmation command or simply a data to be embedded in the frame which will be generated and transmitted. The output lead of serializer 1000 is transmitted to the transparent input lead of header generator circuit 1120. The latter is clocked by the signal existing at the output lead of AND gate 1100 and generates an appropriate frame pattern at its output lead which is transmitted to tri-state driver 1130, which output lead is connected to TxData lead 2041, being the dotted output point of all the different modules. When a determined module is not actually transmitting, its corresponding tri-state driver 1130 is enabled. As will be explained below, the output lead Txdata 2041 carries the time division multiplexed (TDM) frame which is built from the output signals of the 30 different modules 1–30. With respect to module 1 again, Tri-state is enabled by ENSLOT1 control signal which is generated by Txclk generator 2000 as mentioned above.

Figure 5A:
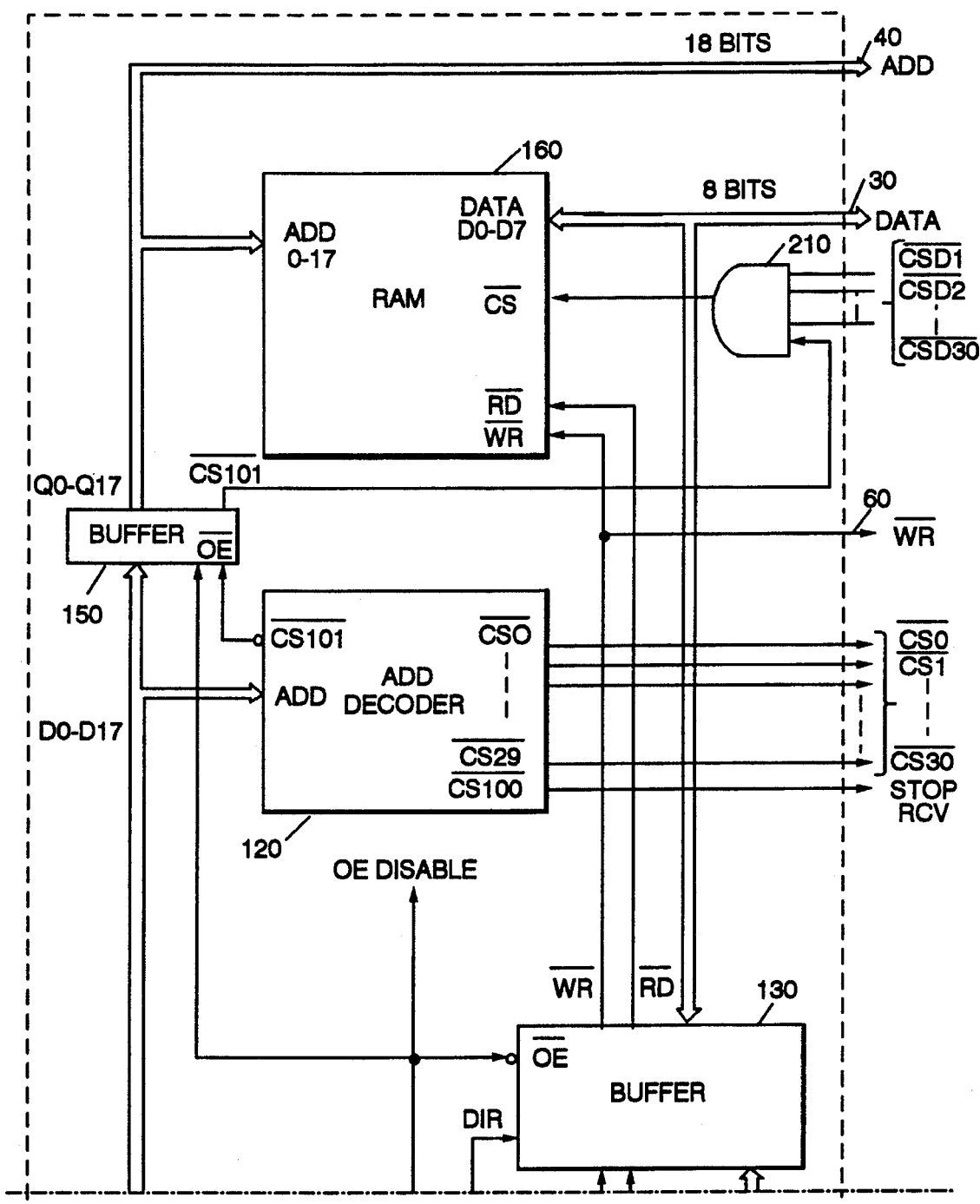
FIGS. 5, consisting of FIGS. 5A and 5B, and 6, consisting of FIGS. 6A and 6B, are illustrative views of the structure of the Receive part of the machine according to the present invention.
Figures 5, 5B:
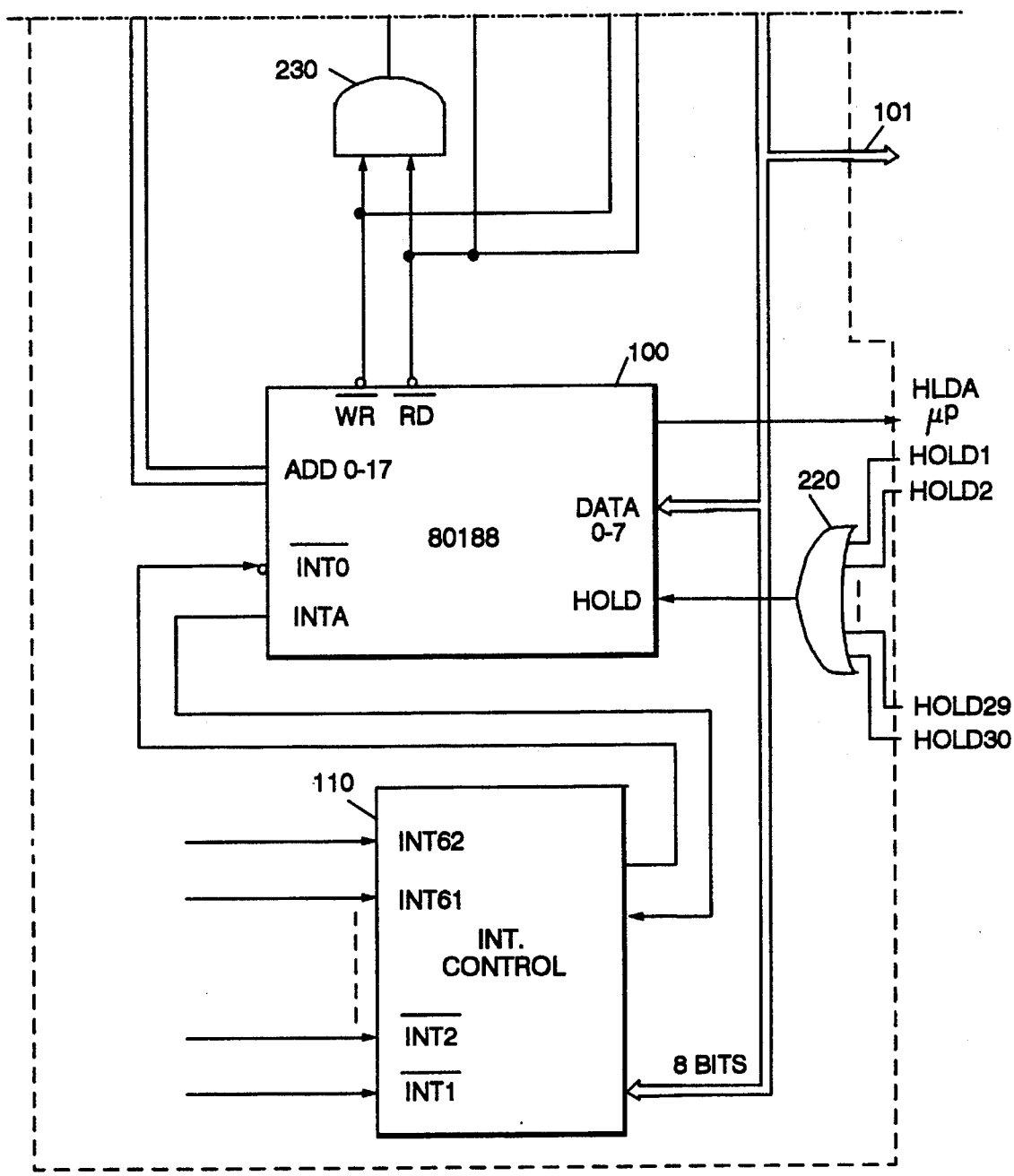

FIG. 5 illustrates the basic circuit of the Receive part of the machine. As it appears in the figure, some basic components which were already described above are shared by both the Transmit and Receive part of the machine, particularly processor 100, Address decoder 120, buffers 130 and 150, and RAM storage 160, are shared between the Transmit and the Receive part. Additionally, an Interrupt Controller 110 is connected to processor 100 through its data bus and provides the handling of a set of 62 interrupt signals INT1 . . . INT62 received from the different parts of the machine.

Figure 6A:
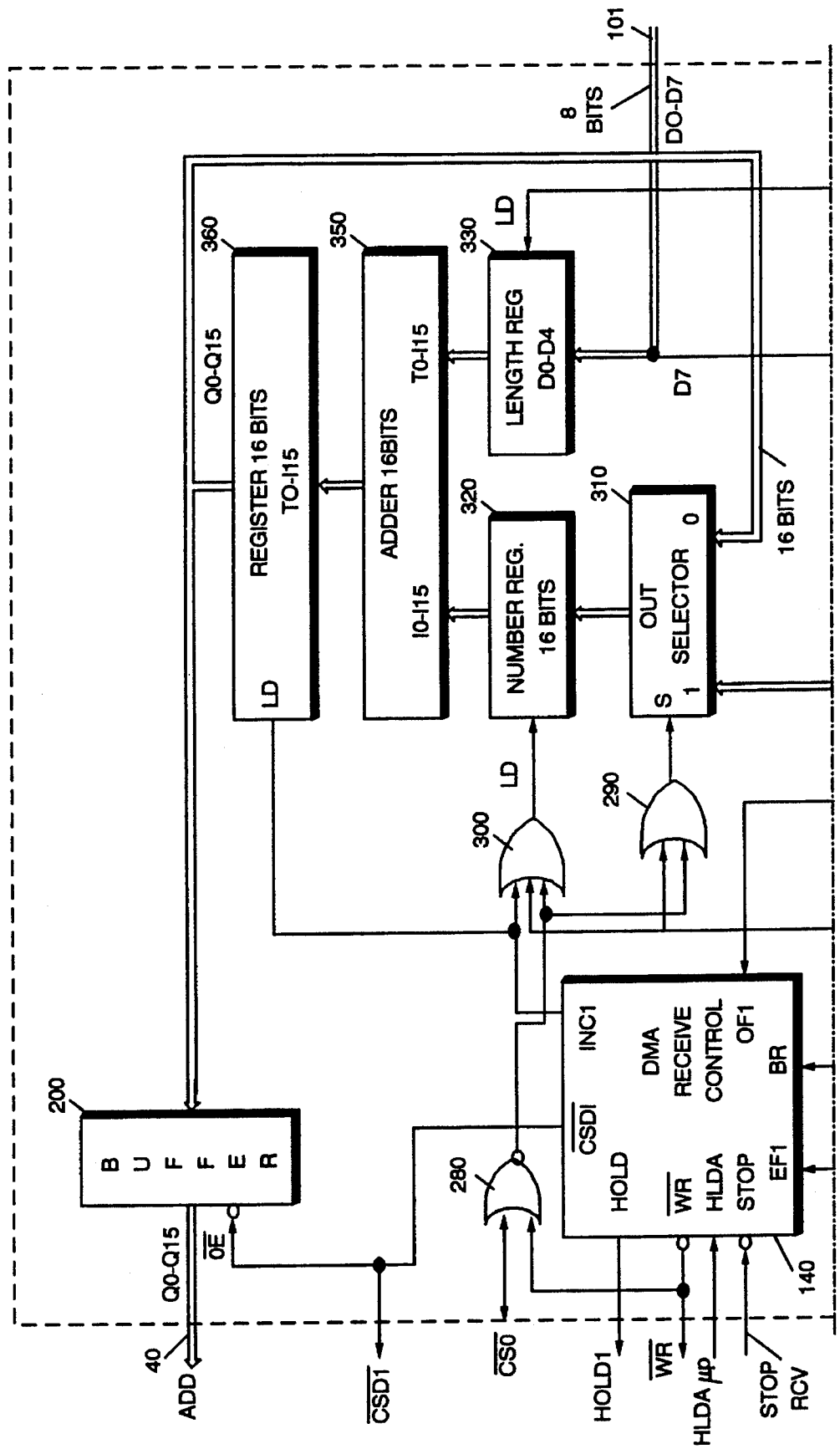
Figure 6B:
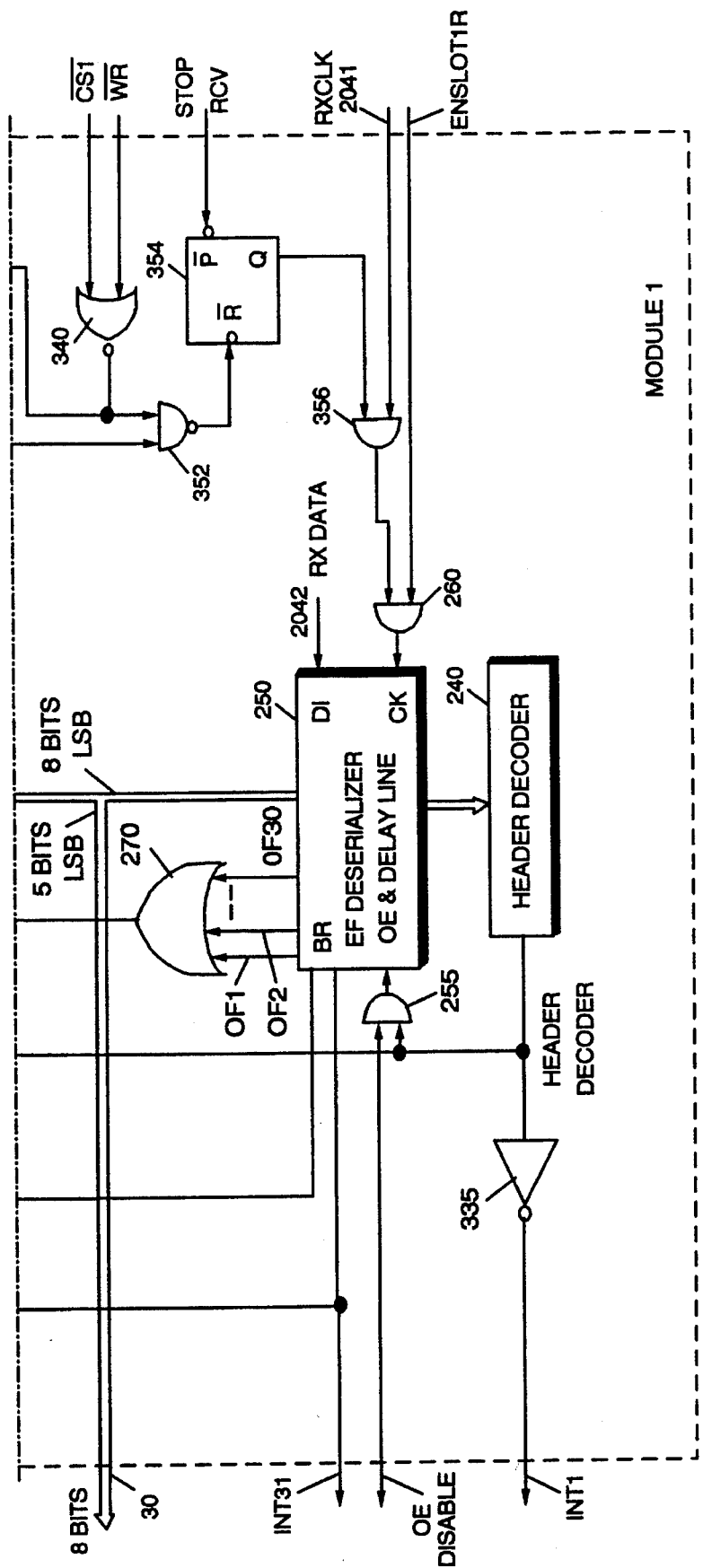

FIG. 6 shows the additional circuits which compose each of the 30 modules which are included in the Receive part of the machine. Because each module has a similar structure, only the Receive part of one among the 30 modules, referred to as RECEIVE module 1, is represented in FIG. 6 and will be described hereinafter with details. The skilled man will straightforwardly derive the structure and arrangement of the additional 29 modules which are necessary for provide the comprehensive RECEIVE part of the machine. With respect to FIG. 6, each module, such as module 1, comprises a DMA receive control 1 element 140 which is used for providing the direct access to RAM storage 160. Receive module 1 further includes a deserializer and delay line circuit 250 which basically consists in a common SDLC or HDLC receiver. Such a component, as it is well known in the art, provides the CRC checking, the traditional zero-delete and flag decoding operations. The deserializing of the serial flow of data, existing at its DATA INPUT (DI) lead which is connected to RXDATA lead 2042, is performed at the rythm of a clock signal which is generated by an AND gate 260 having its two input leads respectively receiving the output of an AND gate 356 and ENSLOT1-R signal from RECEIVE CLOCK generator 2045 which will be described with further details in reference with FIG. 8A and 8B. AND gate 356 has a first input lead receiving RxClk on lead 2041 and a second input lead receiving the output of a Set-Reset latch 354, which preset and reset input leads respectively receive the STOP RECEIVE signal generated by Address decoder 120 and the output signal of an NAND gate 352. NAND gate 352 has a first input lead connected to the output of a NOR gate 340, and a second input lead which is connected to the Most Significant Bit (MSB) of data bus 101, i.e. D7 in the assumption of a 8-bit-data bus D0–D7. NOR gate 340 has a first input lead which receives Chip Select 1 (CS1) signal generated by Address decoder 120, and a second input receiving the WRITE signal generated by processor 100. The output lead of NOR 340 is also connected to the LOAD control input lead of a register 330 which has a 5-bit input bus connected to the least significant bits of bus 101.

The sequence of received bytes is also received by a a HEADER DECODER circuit 240 which generates a HEADER DECODED control signal on the occurence of the header "7Exx7E" (in hexadecimal). This control signal is also transmitted to a first input of an AND gate 255 having a second input connected to the OEDISABLE output lead of AND gate 230, and which has an output lead connected to the OUTPUT ENABLE (OE) lead of deserializer 250. This allows the deserialized data be transmitted to the output bus D0–D7 of deserializer. The HEADER DECODED output signal of Header Decoder 240 is also transmitted to the first input lead of an OR gate 290, as well as to a first input lead of an three-input-OR gate 300. OR gate 290 and OR gate 300 have a second input lead which is connected to the output lead of an NOR gate 280, the latter receiving at its two input leads a Chip Select CS0 signal generated by Address decoder 120 and the WRITE (WR) signal which is generated by processor 100. OR gate 290 has its output lead which is connected to a control lead S of a Selector 310, the latter having two input busses respectively connected to the five Least Significant Bits (LSB) of the output bus of deserializer 250, and to the sixteen bits of the output bus of a 16-bit-register 360. According to the state of S control lead, Selector 310 transmits the contents of one among its two input busses to an output which is connected to the input lead of a NUMBER REGISTER 320. The 16-bit output bus of NUMBER register 320 is connected to a first 16-bit input bus of a 16-bit Adder 350, the latter having a second 8-bit bus receiving the output of a LENGTH REGISTER 330. The addition of the 16-bit contents loaded into NUMBER REGISTER 320 with the least significant eight bit existing at the second input of ADDER 350 is performed and transmitted to an input bus I0–I15 of 16-bit register 360.

As mentioned above, the output bus of register 360 is connected to one input bus of selector 310, but also to an input bus of a buffer 200 which is controlled by an Ouput Enable (OE) control lead receiving the Chip Select CSD1 signal which is generated by DMA RECEIVE CONTROL 1 circuit 140. The output of buffer 200 is connected to address bus 40 of RAM 160. As mentioned above, it straightforwardly appears that since the 30 receive modules are similar to the module 1 which is described, the address bus 40 of RAM 160 is connected to the output of 30 buffers, which are identical to buffer 200 of module 1, each buffer being included into its corresponding module. With respect to FIG. 5, RAM 160 has a Chip Select (CS) input lead which receives the output signal of a 31-bit AND gate 210. Each of the 30 first input leads of AND gate 210 is connected to one CHIP_SELECT_DATA (CSD) output lead, e.g. CSD1 for module 1, CSD2 for module 2 etc... Additionaly, AND gate 210 has a 31th input lead which is connected to received a CHIP_SELECT control signal CS101 which is generated by ADDRESS DECODER 120, and transmitted to AND gate 210 through buffer 150. This transmission is performed on the occurrence of an active control signal appearing at the Output Enable (OE) control lead of buffer 150, the latter being generated by an AND gate 230 which is illustrated in FIG. 5.

With respect to FIG. 6 again, OR gate 300 has a third input lead which is connected to the INC1 output lead of DMA RECEIVE CONTROL circuit 140, which output lead is also connected to the LOAD (LD) input lead of register 360. Deserializer 250 has an OPENING-FLAG1 (OF) output lead which is set to a high level on the occurrence of the detection of an opening flag "7E", which OF output lead is connected to one input lead of a 30-input OR gate 270. Each of the 30 input leads of the latter gate receives the OPENING_FLAG control signal of the deserializer which is included into a corresponding module 1–30. The output of OR gate 270 is transmitted to a corresponding Opening-Flag input lead of DMA RECEIVE-1 control circuit 140. DMA RECEIVE-1 control circuit 140 has an HOLD output lead which is connected to one input lead of a 30-input lead OR gate 220, shown in FIG. 5. Each of the other input leads of OR gate 220 being connected to the HOLD output lead of a corresponding DMA RECEIVE control circuit which is located within one among the 30 modules. DMA RECEIVE control circuit 140 (FIG. 6) has a HLDA (Hold Acknowledge) input lead which is connected to a corresponding HLDA output lead of processor 100. Deserializer 250 has an 8-bit output bus which is connected to a first input/output bus of bidirectional buffer 130, the second I/O bus of the latter being connected to data bus 101.

Figure 7A:
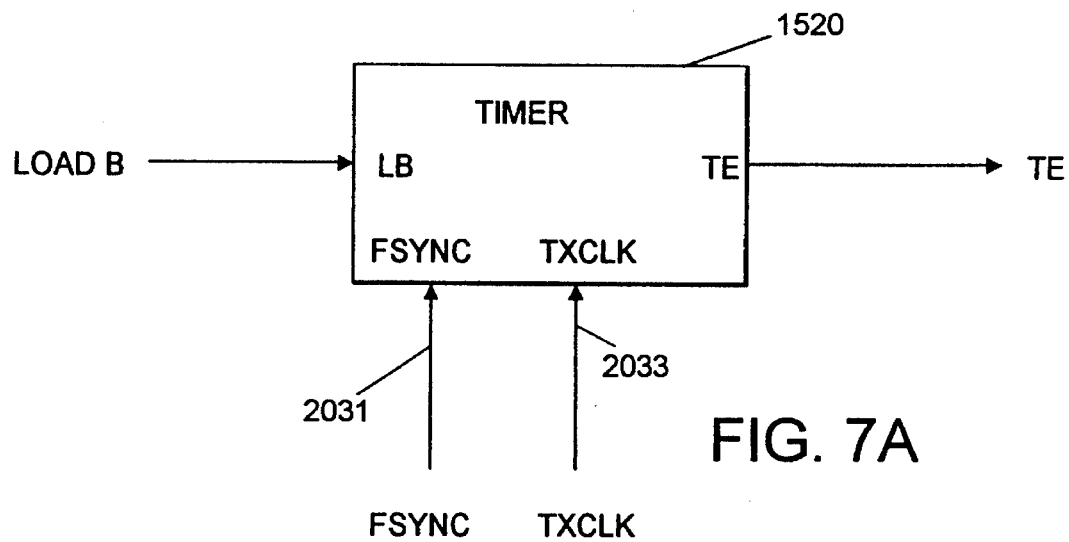
FIGS. 7A and 7B illustrate the timing generation process which is involved in the Transmit part of the machine.
Figure 7B:
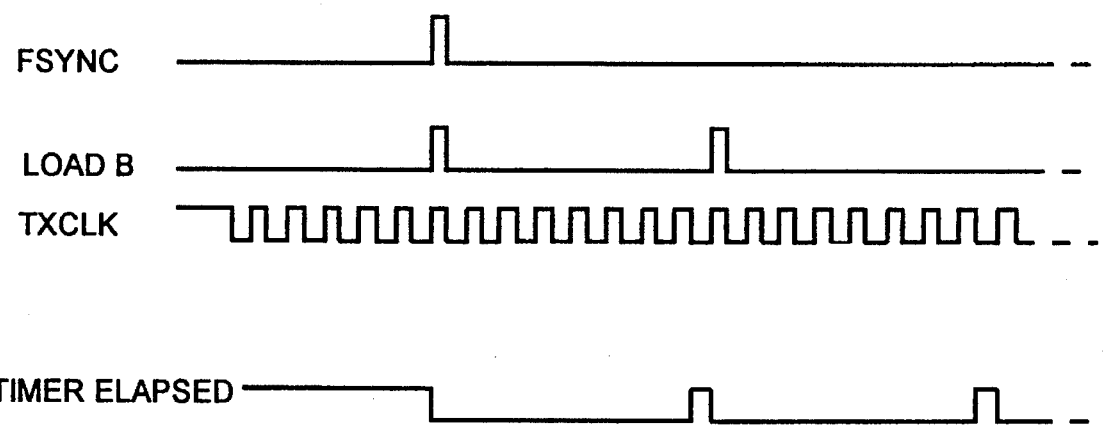

FIG. 7A and 7B respectively illustrates a synoptic view and timing diagrams of the Tx clock generator of the transmit part. Tx clock generator 2000 receives ESYNC signal on lead 2031 and TxClk signal 2033 which are both generated by PRACT 2030 (FIG. 1). From this signals, TxClk generator 2000 generates Enslot1-T, Enslot2-T, ... Enslot30-T, an CSync signal indicating a change of the slot which is currently transmitted. Representative timings of the above signals are illustrated in FIG. 7B. From the latter timing diagrams, the skilled man will straightforwardly drives the appropriate detailed structure of the Tx clock generator.

FIG. 8A shows the Receive clock generator 2045. The latter receives FSYNC signal on lead 2031 and RxClk signal 2032 which are both generated by PRACT 2030 (FIG. 1). From those signals, generator 2045 outputs ENSLOT1-R, ENSLOT2-R, ... ENSLOT30-T, each output signal being set to "1" when the received data is affected to the corresponding slot. Timing diagrams of those signals are illustrated in FIG. 8B. The skilled man will straightforwardly derives the detailed structure of the receive clock generator 2045 from these timing diagrams.

Figure 9A:
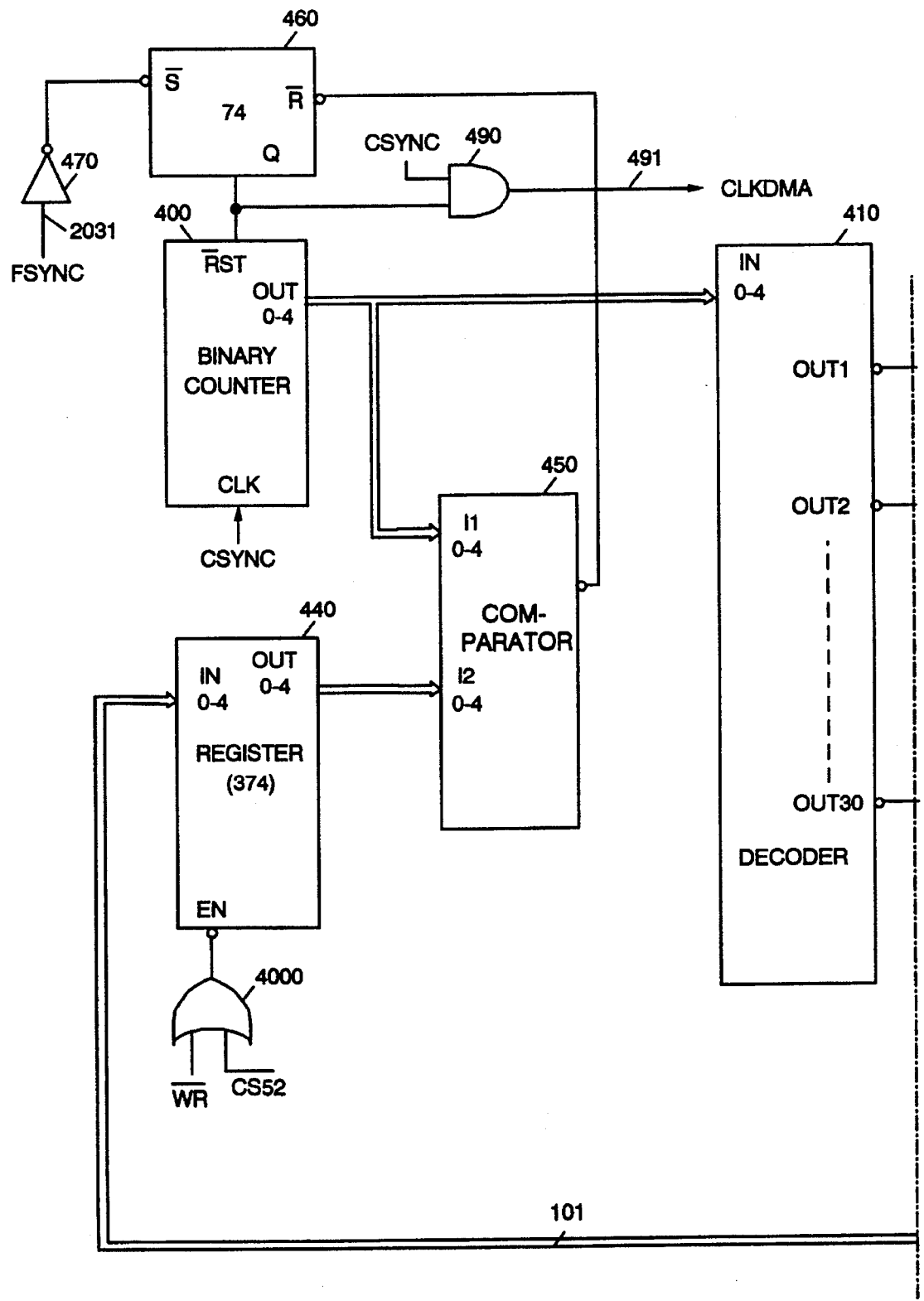
FIG. 9, consisting of FIGS. 9A and 9B, shows the structure of the Matrix switching component embodied in the apparatus according to the present invention.

With respect to FIG. 9, there is illustrated the structure of MATRIX SWITCHING circuit 1500. Circuit 1500 includes a DECODE 430 which has 30 output leads EN1–EN30, plus an additional ENABLE OR output lead carrying the result of the OR operation of the 30 output leads EN1–EN30. Decoder 430 has a 5-bit input bus which is the dotted output bus of a set of 30 registers 500-1 500-30 Each of the above 30 register is controlled by a LOAD control signal which is generated by a corresponding output lead 01-030 of a cyclic addressing counter 420. Counter 420, on the occurrence of one pulse at the output of a OR gate 4010, increments the order of the control signal 01-030 which is activated so that the corresponding register 500-1 . . . 500-30 be loaded. OR gate 4010 receives at its two input leads Chip_Select_60 sign generated by address decoder circuit 120 and WRITE signal produced by the processor 100. Each of the above 30 register has an ENABLE (EN) input lead which is connected to a corresponding output lead OUT1–OUT30 of a decoder 410 having a 5-bit input bus receiving the contents of a binary counter 400, which contents being also transmitted to a first 5-bit-input bus of a comparator 450. Comparator 450 has a second 5-bit input bus which is connected to the 5-bit output bus of a register 440, which input bus receives the contents of data bus 101. Bus 1561 101 is also connected to the input bus of each of the register 500-1 to 500-30. The ENABLE input lead of Register 440 is connected to the output lead of a OR gate 4000 which receives at its two input WR control signal with a Chip-Select control signal generated by Address Decoder 120. The output of Comparator 450 is connected to a reset input lead of a Set_Reset Latch 460 which output lead Q is transmitter to the reset input lead of Binary counter 400 clocked by the CSYNC clock signal generated by Transmit Clock Generator 2000 illustrated in FIG. 7A, and also to a first input lead of an AND gate 490 having a second input lead also receiving CSYNK signal. The output of AND 490 generates a DMA clock signal 491 which is transmitted to DMA Xmit control circuit 1510 of FIG. 3. The set input lead of Set-Reset latch 460 receives the output of an inverter gate 470 driven by the FSYNC signal 2031 generated by PRACT 2030.

Figure 10A:
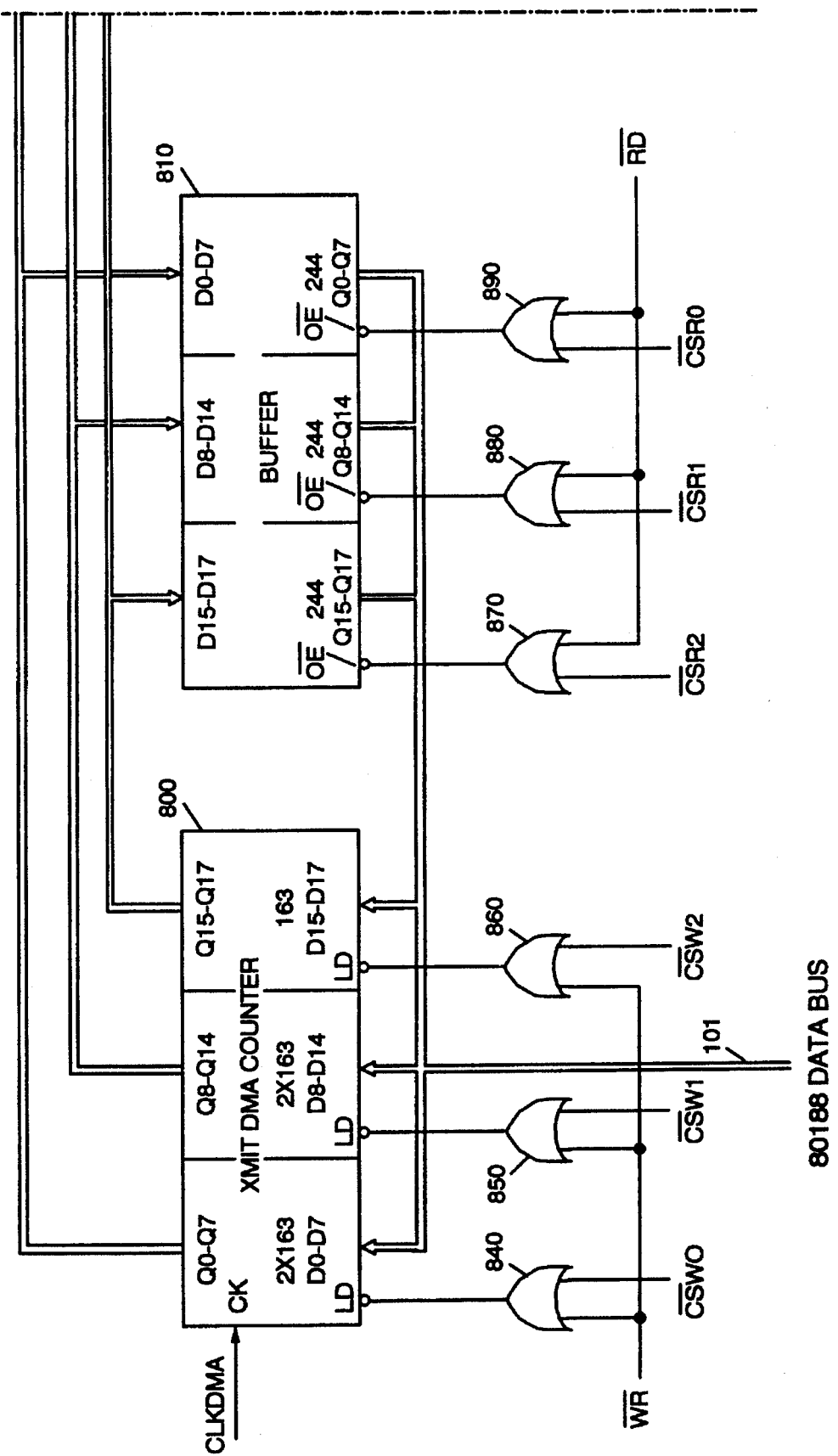
FIG. 10, consisting of FIGS. 10A and 10B, illustrates the DMA XMIT control Addresses generator FIGS, consisting of FIGS 11A and 11B, consisting of FIGS. 12A and 12B and 13 are illustrative views of the different state machines which are involved in the DMA TRANSMIT and RECEIVE CONTROL circuits.
Figure 11A:
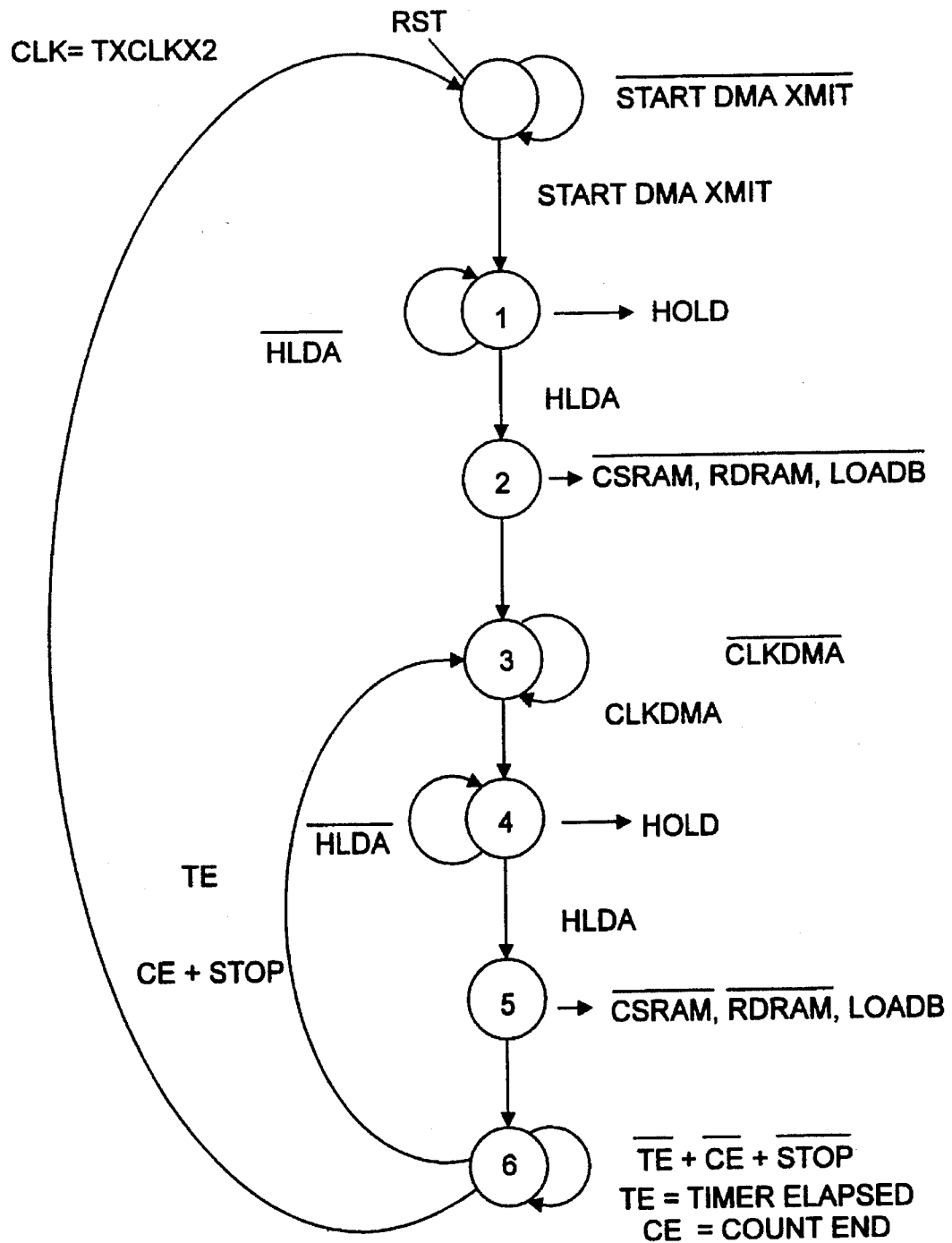
Figure 12A:
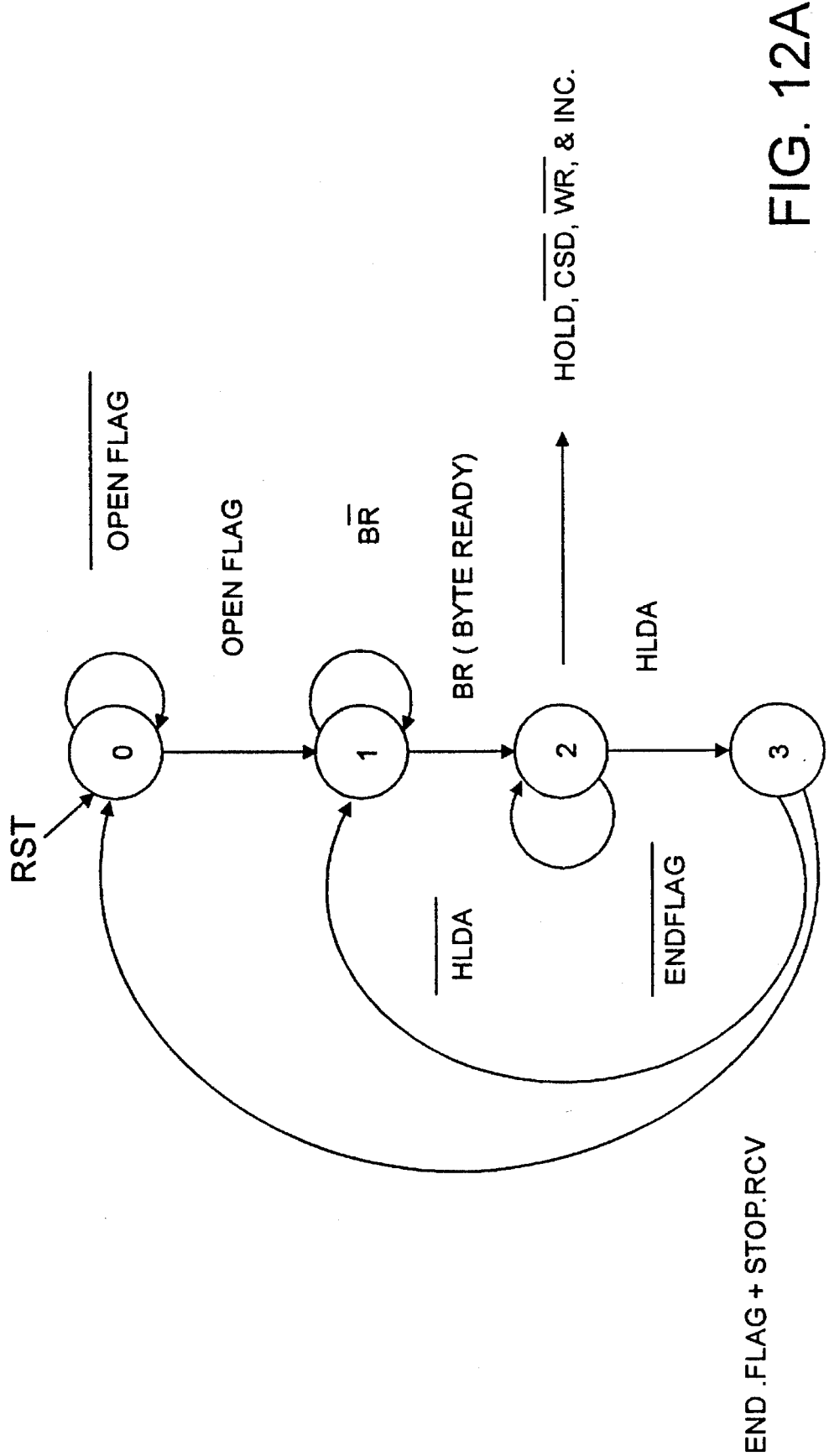
Figure 13:
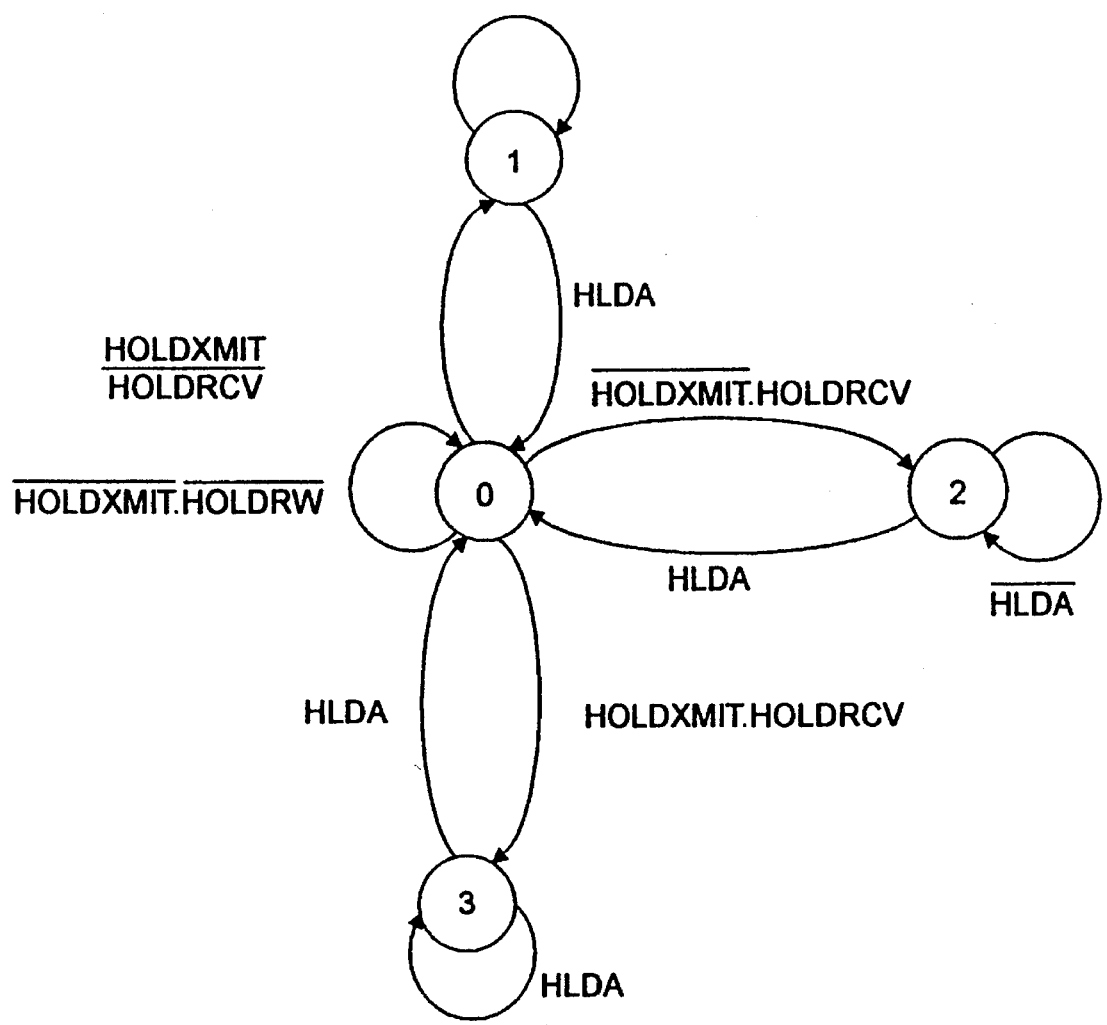

FIG. 10 illustrates the part of the DMA transmit control circuit 1510 which provides the generation of the addresses which are needed for the addressing of RAM 160, by means of buffer 1540 controlled by processor 100 via inverter 1520, as well as the generation of COUNT END (CE) control signal when the last byte of the HDLC frame to be transmitted is extracted from the RAM storage 160. The structure shown in FIG. 10 is well known to the skilled man; the DMA address generator comprises a Xmit DMA counter 800 which is loaded in three distinctive steps with the starting address value transmitted via bus 101. The 8 Most Significant bits of the address value is first stored when a active Chip_Select CSW0 control signal, simultaneously with an active WRITE control signal, are transmitted to counter 800 via a OR gate 840. Similarly, a second Chip_select CSW1 control signal is used for loading the 6 following bits of the starting address via an OR gate 850. At last, the remainder 6 bits required for forming the 17-bit starting address to be generated for accessing the beginning of the frame loaded into RAM 160 are loaded by means of a third chip_select CSW2 control signal which is conveyed to counter 800 via an OR gate 860. The address generator further comprises a buffer 810 which is associated with corresponding NOR gates 870, 880 and 890, the latter being respectively controlled by chip_select CSR0, CSR1, and CSR2 control signals. The ending address of the frame which is to be transmitted to the ISDN network is loaded into a END_OF_FRAME register 830 which is associated with OR gates 900, 910 and 920. OR gate 900 (resp. 910) (resp. 920) is associated with a chip_select CSC0 (resp. CSC1) (resp. CSC2) control signal. The loading ot the ending address of the frame is achieved by means of data bus 101 under control of processor 100. The output of DMA counter 800 and END_OF_FRAME register 830 are respectively connected to a first and a second input bus of a comparator 820 which generates an output COUNT END control signal when the XMIT DMA COUNTER register 800, clocked by CLOCKDMA clock signal, reaches the value loaded into register 830. The output bus of XMIT_DMA_COUNTER 800 is connected to the 17-bit input bus of buffer 1540 (FIG. 3), which therefore permits the addressing of RAM storage 160. Illustrative timing diagrams of the TxClk, EN1, EN2 and EN3 control signals are represented in FIG. 14. FIGS. 11, 12 and 13 are respectively illustrative views of the structure of the DMA XMIT state machine, the DMA RCV state machine and the Hold Arbitration process which are involved in the operating of the DMA XMIT CONTROL circuit 1510 and DMA RCV CONTROL circuit 140, as will be described below with greater details.

The machine operates as follows: the communication between two different primary terminal adaptors, a first DTE requester and a second DTE remote via an ISDN network is first established through the D-Channel by the Link Access Protocol D-Channel (LAPD) as described in the corresponding CCITT Recommendations. For instance, assuming that a 640 kbps superchannel is desired, a set of 10 elementary B-channels are to be established. Then, an additional synchronization phase is performed by a bidirectional exchange of frame patterns based on the following structure 01111110ABxxxxxx01111110, with A and B corresponding to two synchronization bits which will be used as described below.

The DTE requester transmits on each of the already established B-channel the following frame pattern: 01111110ABxxxxxx01111110, with A and B respectively set to A=1 and B=0. To achieve this, processor 100 first controls header generator 1120 of FIG. 4, by means of the association of chip select CS6, Command/data control signals as well as data bus 101. Therefore, header generator 1120 is programmed to produce at its output lead the above mentioned frame pattern comprising the '7E' flag at the beginning and the end of the frame. The transmission of the frame pattern is performed at the occurence of the clock signal appearing at the clock input lead of header generator 1120. That frame is then transmitted to the ISDN network via ACFA element 2040, PRACT 2030 and line transformer 2025 as illustrated in FIG. 1 and will be received by the remote DTE at the other end of the digital network. The same process is to be performed for each module which is associated with any channel involved in the building of the superchannel of 640 kbps in our example. In the considered example, the same frame pattern will be transmitted from the request DTE to the remote DTE on 10 slots by means of 10 different modules of the transmit part of the request DTE.

When the receive part of the remote DTE receives the above mentioned frame pattern, ie "01111110ABxxxxxx01111110" (with A=1 and B=0), the latter is received on RxData lead 2042 via line transformer 2020, PRACT 2030 and ACFA 2040. The received data is deserialized by means of deserializer 250 which is clocked by the output of AND 260. The deserialized data is decoded by header decoder 240 which generates a HEADER DECODED control signal on the occurrence of the sequence "7Exx7E". This control signal is transmitted to an inverter 335, which produces an interrupt signal which is then transmitted to one input lead of a INTERRUPT CONTROL- LER circuit 110, of the type INTEL 8259, via an inverter 335. The control signal appearing at the HEADER DECODED output lead of header decoder 240 being also transmitted to the LOAD input of NUMBER REGISTER 320 (via OR gate 300) and to the S control lead of selector 310 (via OR gate 290), the occurrence of the succession of two flags separated by one byte "01111110ABxxxxxx01111110" results in the loading of the contents of the 5 least significant bits of xxxxxx into register 320. It should be noticed that this loading operation will not be used in this step of the synchronization procedure.

The interrupt signal is then transmitted to processor 100, via INTO input lead, and initiates an appropriate interrupt process. The process generates an Interrupt Acknowledge (INTA) signal to INTERRUPT CONTROL 110. The interrupt control 110 to generates an appropriate interrupt vector on address/data bus 101, resulting in the initiating of the corresponding interrupt routine which is stored into the PROM storage (not shown in the figure) and associated to processor 100. The latter interrupt routine results in processor 100 performing a READ operation of the contents of the output bus of deserializer 250. This is achieved by means of buffer 130 which is controlled by means of a negative pulse on READ or WRITE control leads of processor 100 which is transmitted to the Output Enable (OE) input lead of buffer 130 via an AND gate 230. Therefore, the direction of the buffer is controlled so that the contents of the output bus of deserializer 250 is transmitted to address/data bus 101. Therefore, processor 100 becomes aware of the contents of the synchronization frame, ie the value of "ABxxxxxx" (in binary). If the frame received contain the values A=1 and B=0, processor 100 initiates a transmission of a second synchronization frame of the format described above on the same channel (e.g. channel 1 in the considered instance) with the values A=1 and B=1. This is achieved in accordance with the principles of transmission which were described above. Briefly, processor 100 of the remote DTE controls header generator 1120 included in its transmit part, particularly by loading the values A=1 and B=1 via address/data bus 101, so that the latter header generator generates the second synchronization frame which will be transmitted to the requesting DTE via the ISDN network.

This second synchronization frame is then received by the receive part of the DTE which has requested the link. As above, for the processing of the first synchronization frame which was received by the remote DTE, the second synchronization frame is received at the Data Input (DI) lead 2042 of deserializer 250, and parallely decoded by header decoder 240. Upon detection of a synchronization frame "01111110ABxxxxxx01111110" header decoder generates a HEADER DECODED control signal which is transmitted to interrupt controller 110 and also to the Output Enable (OE) lead of deserializer 250. Similarly as above, the detection of the latter synchronization frame entails the loading of the five least significant bits of "xxxxxx" into number register 320 of the receive part of the requesting DTE. It should be noticed that, the contents of the Least significant bits of "xxxxxx" is not actually used at this step of the synchronization process. Therefore, accordingly with the corresponding interrupt routine, processor 100 performs a READ operation of the byte which has appeared at the output bus D0–D7 of deserializer 250 via bidirectional buffer 130.

If the second synchronization frame appears to comprise the desired values A=B=1, the requesting DTE transmits a third synchronization frame comprising values of A and B which are set to A=0 and B=0, the third synchronization frame comprising data bits "xxxxxx" which are set to a predetermined value defined in accordance with the actual order of the establishment of the link. This value of "xxxxxx" does not correspond to the ISDN slot number, but is affected according to the time at which the corresponding slot has been established. For instance, assuming that the ISDN slot number 5 is established at first, the requesting DTE will assign it the number 1 (in decimal) or "000001" (in binary).

Upon reception of the third synchronization frame, which reception is achieved as below, the remote DTE sends back a fourth synchronization frame comprising the values A=0 and B=1, with the actual value of "xxxxxx" which was assigned by the Requesting DTE for the transmission of the third synchronization frame. The fourth synchronization frame is then received by the requesting DTE. The reception of the fourth synchronization frame in the receiving part of the requesting DTE entails, as described above, the update of the loaded value of the contents of NUMBER REGISTER 320. Therefore, NUMBER REGISTER 320 is loaded with a value which corresponds to the accurate order at which the considered channel has been established, e.g. the value "00001" for the channel number 5 with the assumption that this channel has been established. After the checking of the received value of "xxxxxx" existing in the fourth frame with that existing in the third frame, the requesting DTE can conclude that the corresponding channel is now available for the digital communication.

The above procedure is performed in parallel for each of the 10 channels, each channel being assigned a specific order number "xxxxxx" which is time related with its establishment, until all the different channels required for the building of the superchannel (ie 10 channels in the considered assumption) are actually established and assigned their own specific order number. It should be noticed, during the above described synchronization protocol, any event which does not conform to the above procedure (for instance the reception of bad values of A and B . . . ) will reset the whole procedure The same effect will occur if the whole procedure does not complete at the end of a specific period, which is fixed to 3 seconds in the preferred embodiment of the invention.

Whenever the last channel required for the building of the superchannel has been established, the initialization synchronization procedure completes and the requesting DTE starts the transmission of data through all the established 64 kbps channels.

The transmission starts with a first step during which matrix switching circuit 1500 is programmed as follows: First, the number of 64 kbps channels which are required for the building of the superchannel is stored within register 440. This is achieved by a simultaneous WRITE and CHIP_SELECT_52 control signals which are generated by processor 100 and Address decoder 120 also controlled by the latter processor, with the occurrence of the appropriate value of the number of B-channels on data bus 101. Then, processor 100 stores into each of the registers 500-1 to 500-30 the value of the ISDN slot which has been affected by the Network Terminator. For instance, assuming that the D-channels has chronologically affected the 10 following B channels: n[1, 4, 6, 7, 8, 11, 15, 16, 21, and 5, register 500-1 is loaded with the value "1" register 500-2 is loaded with the value "4", register 500-3 is loaded with the value "6" and so on. The loading of the appropriate values within registers 500-1 to 500-30 is achieved by means of Cyclic addressing counter 420 which sequentially performs the loading of the values to be stored via data bus 101. This loading is performed on each clock pulse appearing at the output of NOR 4010. It should be noticed that only the 10 first registers (in our example) will be loaded with valid data. The remainder 20 registers will be loaded non valid data.

When this first process completes, Matrix Switching 1500 becomes capable of generating the Clock DMA signal 491, also with the different EN1–EN30 control signals which will permit the constitution of the superchannel. On the occurrence of a positive FSYNC pulse, coinciding with the beginning of the 30-channels Time Division Multiplex Frame illustrated in FIG. 2 latch 460 is set, and its output resets binary counter 400. Then, the counter 400 is incremented at every Csync clock pulse (FIG. 7*b*) produced by the Tx clock generator 2000, two successive FSYNC clock pulse being separate by 30 Csync clock pulses. Counter 400 is incremented until comparator 450 produces a reset control signal transmitted to the reset input lead of latch 460. This reset control signals occurs upon the detection of an equality between the contents of register 440 and the contents of counter 400, i.e. when the number of CSYNC clock pulse equals to the number of required B-channel to constitute the desired superchannel. In our instance, the reset of counter 400 is performed on the occurrence of the 10th CSYNC clock signal. According to the contents of counter 400, decoder 410 activates the corresponding register 500-1 to 500-30, ie one among the 10 first register 500-1 to 500-10 in the example of the building of a 640 kbps superchannel. When one among the latter registers has its ENABLE (EN) input lead set to "1", it produces at its output the value which has been preliminary loaded by processor 100 during the initialization of Matrix Switching circuit 1500. In our instance, register 500-1 will generate the value "1" (in decimal), register 500-2 will produce the value "4" to the input bus of decoder 430 etc . . . Decoder 430 decodes the value appearing at its input bus and activates a corresponding Enable control signal (ie one among the 30 control signals EN1–EN30). The clock DMA signal on lead 491 being generated by AND gate 490 is used as a clock signal for DMA Transmit control circuit 1510.

The HDLC frames which are stored within RAM 160 are transmitted to the Tx Data lead as follows:

Processor 100 first programs the DMA with the starting and ending address of the HDLC frame which is to be transmitted. This is achieved by providing the starting address on bus 1511, via buffer 130, simultaneously with appropriate chip select control signals. In the preferred embodiment of invention, the address of storage within RAM 160 uses 17 bits and bus 101 having only 8 bits, the storage of the starting address of the frame is performed in three successive steps, ie by the way of the three chip_select CSW0, CSW1 and CSW2 control signals. Similarly, the storage of the ending address of the HDLC frame to be transmitted is achieved by means of a succession of three distinctive steps involving the chip_select CSR0, CSR1 and CSR2 control signals as mentioned above.

Then, processor 100 generates an address which is decoded by Address decoder 120 so that the latter generates a chip select CS52 control signal which is transmitted to the START input of DMA TRANSMIT CONTROL 1510. The operating of DMA TRANSMIT CONTROL 1510 then conforms to the state machine illustrated in FIG. 11. On the reception of the START DMA control signal, the state machine proceeds to state 1 where the machine generates an HOLD signal which is transmitted to processor 100. As soon as the latter acknowledges the received HOLD signal, an HLDA hold acknowledgement signal is sent back to DMA Xmit CONTROL 1510, and the state machine of FIG. 11 proceeds to state 2. State 2, there is generated the CSRAM, RDRAM and LOADB control signals for the access of the bytes of the frame which are located within the RAM and the state machine proceeds to step 3 where it waits for the occurrence of the next DMACLOCK signal.

The address provided at the output of the DMA address generator of FIG. 10 is transmitted to the address bus of RAM 160 via buffer 1540 (FIG. 3), and the generation of the appropriate RAM chip_select and READ control signals entails the first byte of the HDLC frame which is loaded within register 1560. That first byte appearing at the output bus of buffer 1560, is then transmitted to all the serializers of the 30 modules as shown in FIG. 4. The serializer which is included in the appropriate module, ie the module corresponding to the B-channel which will be used for the transmission (ie module 1 in our instance), latches the first byte because of the simultaneous presence of an active LOADB and ENABLE signal at the input leads of AND gate 1110 controlling the serializer. That first byte which is latched by the serializer 1000 is shifted to the header generator 1120, as well to the buffer 1130, at the rythm of the shift clock appearing at the output of GATE 1100. Therefore, as shown in the timing diagrams of FIG. 7*b*, AND gate 1100 provides 8 elementary clock pulses so that the 8 bits of the byte are transmitted, via the header generator 1120 and buffer 1130, to TXdata lead 2041. Buffer 1130 is enabled by means of ENSLOT1 control signal.

The following bytes which are extracted from RAM storage 160 are similarly transmitted and latched by one serializer in accordance with the values stored into registers 500-1 to 500-30 of Matrix Switching 1500. Therefore, the whole HDLC frame is transmitted through the different preassigned ISDN slots (in our example slot 1, 4, 6, 7, 8, 11, 15, 16, 21 and 5) at the required bandwidth, ie 640 kbps. The extraction of the second and following bytes of the HDLC frame is achieved as described below with respect to the state machine diagram of FIG. 11: on the occurrence of the CLKDMA signal generated by AND gate 490, the state machine proceeds to step 4 where it generates a further HOLD signal so that the second byte of the HDLC frame can be accessed. This access is actually performed by the generation of the CSRAM, READRAM and LOADB control signal in state 5. Then, the machine proceeds to state 6. Step 6, the machine checks the presence the TIMER ELAPSED, or COUNT END signal generated by comparator 820, or STOP control signal generated by processor 100 via CS53 chip select control lead. TIMER ELAPSED signal is a signal which is generated by a TIMER 1520 in FIG. 7A, which timing diagram is represented in FIG. 7B. On the occurrence of the TIMER ELAPSED signal, the state machine proceeds to state 3 so that a further byte can be processed, extracted from RAM and transmitted to the TXDATA lead 2041 via the appropriate module. On the occurrence of a STOP signal, indicating that processor 100 wishes to get access to the address bus, or to the COUNT END signal, indicating that a whole frame has been extracted from the storage, the state machine proceeds again to state 0.

Similarly to the transmitting DTE, before the remote DTE becoms capable of processing the HDLC frame which was transmitted, a first initialization step is performed in the receiving DTE as follows: Firstly, processor 100 loads LENGTH REGISTER 330 (FIG. 6) with the appropriate value corresponding to the number of 64 kbps B-channels which are required for the building of the superchannel. In the considered example, register 330 is loaded with the value "10" since a 10×64 kbps superchannel is to be build. This is achieved by the activation of chip_select1 and WRITE control signal at the inputs of NOR gate 340, associated with the generation of the 5 LSB corresponding to the number of B-channels forming the superchannel. Since the output of NOR gate 340 is set at a high level, the above 5 LSB are stored within register 330. It should be noted that the most significant bit of the bus 101 is used for resetting latch 354 via NAND gate 352. Latch 354 is used for the deactivation of its corresponding module since its Q output lead is used for enabling the reception of Rxclock via AND 356. In this way, processor 100 is capable of modifying the distribution of the modules which are used for the building of the superchannel. For instance, when processor 100 wishes to disable one determined module, the corresponding latch (eg latch 354 for module1) is resetted. Latch 354 of module 1 can be preset by means of a STOP RECEIVE signal coming from the CHIP_SELECT 100 of address decoder 120 controlled by processor 100.

Since the above described synchronization procedure has been previously completed, number register 320 is loaded with the appropriate value, in the considered example with the value "1" for module 1 (value "4" for module 2 etc . . . ).

After the completion of the above first step in the receiving DTE, it is able to process the data which comprises the HDLC frames received from the ISDN network. The first byte of the HDLC frame, consisting in the "7E" flag, is received on RxData lead 2042, at the input lead of deserializer 250 of module 1, since the ISDN slot 1 is assigned to module 1. That flag is decoded and results in the activation of OPENING FLAG 1 output lead of deserializer 250. This OPENING FLAG 1 signal is transmitted to the first input of each 30-input OR gate which is associated with the corresponding module, eg OR gate 270 for module 1, what results in the transmission of an OPENING FLAG signal to every DMA RECEIVE CONTROL circuits, such as circuit 140 for module 1. Each DMA RECEIVE CONTROL circuit operates as illustrated in the state machine diagram of FIG. 12A and 12B: on the reception of the OPENING FLAG signal, every state machine of modules 1–30 proceeds from state 0 to state 1.

The second byte of the received HDLC frame is received on the 4th ISDN slot in our assumption since module 1 was assigned the first ISDN slot, module 2 the 4th, module 3 the 6th etc . . . Since the ENSLOT1-R signal is disactivated, DESERIALIZER 250 of module 1 is no longer shifted. On the contrary, the DESERIALIZER 250 of the second module receives a set of 8 pulses at its clock input lead via AND gate 260 of module 2, what activates the BYTE READY output lead of DESERIALIZER 250 of module 2. With respect to FIG. 12A, the reception of the latter BYTE READY (BR) signal results in the state machine of DMA RECEIVE CONTROL 2 being proceeded to state 2. As illustrated in the FIG. 12A, the state machine generates the HOLD, CHIP_SELECT DATA (CSD) WRITE (WR) and INCREMENT (INC) control signals. The address bus of RAM 160 carries a value which is determined by the output of buffer 200, receiving the value loaded into register 360 of module 2 (only register 360 of module 1 being represented). This value is the result of the addition of the contents of register 320 and 330. Since the assumption was that the second module has been the second one to be established, register 320 of module 2 is loaded with value "2", while register 320 of module 1 is loaded with the value "1". Since register 330 of module 2 is loaded with the value "10", the buffer 200 associated with the second module generates an address value equal to "12". This value is used for loading the second byte of the HDLC frame, ie the byte just after the "7E" flag.

EN1, ENL, . . . is equivalent to ENSLOT1R, ENSLOT2R, . . . because the transmit clock has the same frequency and phasis as the receive clock. More than this, the FSYNC signal which times the start of the frame is unique for receive and transmit part.

Since the third byte of the HDLC frame is received on the sixth slot of ISDN Time Division Multiplex frame (in our example), the latter is deserialized by deserializer 250 of module 3. Similarly as above, this is achieved by means of the 8 clock pulses which are transmitted to the clock input lead of deserializer 250 of module 3 via AND gate 260 of module 3. The BYTE READY signal at the output of that deserializer is activated, resulting in the DMA RECEIVE CONTROL state machine of module 3 being proceeded from state 1 to state 2. Therefore, there is generated the HOLD, CHIP_SELECT_DATA, WRITE and INCREMENT (INC) control signals which are required for the access of the RAM 160. Since the NUMBER REGISTER 320 of module 3 is loaded with the value "3", it appears that buffer 200 of module 3 generates the value "13" at the input address bus of RAM 160. Therefore, the third byte is loaded within RAM at a location which is just after that of the second byte.

Each byte of the 10 first bytes of the HDLC frame is therefore successively processed by one corresponding module 1–10 and stored into RAM storage 160. The processing and the storage of the 11th byte is achieved by means of the different INC control signals (INC1 for module 1, INC2 for module 2 etc . . . ) of the corresponding DMA RECEIVE CONTROL circuits (eg circuit 140 for module 1 etc . . . ). As illustrated in FIG. 12B, the INC signal is generated at the state 2 of the state machine. This generation is performed just after the generation of the CHIP_SELECT, WRITE control signals required for the addressing of RAM 160. This INC signal is transmitted to one input of OR gate 300 and to the load input lead of register 360 (for module 1 for instance). Because the output of OR gate 290 is set to a low level, the output of register 360 (for module 1 for instance) is transmitted to the input of NUMBER REGISTER 320 via selector 310 and loaded therein. This value is added to that of register 330 and loaded again into register 360. In our example, since the address of storage of the first byte which was processed by module 1 was "12", the appearance of INC signal results in the 16-bit register 360 being loaded with 12+10 (in decimal)=22. This value will be used for the generation of the storage address value of the 11th byte which will be processed again by module 1. Similarly, the INC signal which is generated by one state machine of the DMA RECEIVE CONTROL circuit of one determined module results in the corresponding register 360 being loaded with an updated value so that all the bytes of the HDLC frame are successively stored in consecutive location within RAM storage 160. For instance, after the processing of the second byte of the HDLC frame by module 2 (assigned to the ISDN slot number 4), register 360 of module 2 is loaded with the address value 13+10=23 (in decimal)

The whole HDLC frame is therefore processed and stored in consecutive locations within RAM storage 160. On the occurrence of the last byte of the currently processed HDLC frame, being the ending "7E" flag, the deserializer 250 of the module processing the last byte generates a ENDING FLAG signal which is transmitted to an input lead of its corresponding DMA RECEIVE CONTROL circuit (circuit 140 of module 1 for instance). This results in the corresponding state machine illustrated in FIG. 12A being reset to state 0. The ENDING FLAG signal is also transmitted as an interrupt signal (eg interrupt 31 for the module 1) to processor 100 via Interrupt controller 110. This results in processor 100 generates a STOP RECEIVE signal which is transmitted to the input lead of the DMA RECEIVE CONTROL circuit of every module 1–30. Consequently, each state machine of each module proceeds to state 0 again. Then processor 100 stores the ending address of the HDLC frame which was just processed and stored within RAM storage 160. From this instant, the whole HDLC frame is loaded in consecutive address locations, and is available for further processing by processor 100.

We claim:

1. Method for transmitting a unique high rate digital data flow over n different independent digital communication channels, n being an integer greater than 1, between two different primary terminal adapters, said method involving the steps of:

establishing, on request of a first DTE to a first remote DTE, a set of n different independent digital communication channels between said two different primary terminal adapters;

determining, during an initialization phase, the relationship between the slot of each channel used for the building of an aggregation superchannel and the chronologic order of the establishment of said channels;

splitting the unique high rate digital data flow into bytes;

transmitting each byte of said unique high rate digital data flow through said set of n different independent digital communication channels in accordance with the chronologic order assigned to each of said set of n different independent digital communication channels;

storing in said first remote DTE each byte of said high-rate digital data flow received from each of said set of n different independent digital communication channels in one single memory storage at an address which is computed in accordance with the formula:

$$A(n)=A(n-1)+n$$

Where $A(n-1)$ corresponds to the address in which the preceding byte conveyed through one of the n different digital communication channels is stored, and n corresponds to the number of digital channels established.

2. Method according to claim 1 characterized in that said initializing phase further involves the steps of:

for each of the set of n different independent digital communication channels:

transmitting a first initialization frame from the first DTE, said first initialization frame comprising a header and a data representative of a request to build the aggregation superchannel, in response to the reception of said first initialization frame in said first remote DTE, transmitting back to said first DTE a second initialization frame said second initialization frame comprising a header and a data representative of an acknowledgment that said first remote DTE has received said first initialization frame;

in response to the reception of said second initialization frame in said first DTE, transmitting to said first remote DTE a third initialization frame comprising a header and a data representative of the chronologic order of the establishment of the set of n different independent digital communication channels;

in response to the reception of said third initialization frame in said first remote DTE, transmitting to said first DTE a fourth initialization frame comprising a header, data representative of an acknowledgment that said first remote DTE has received said third frame and further comprising said data representative of said chronologic order;

and in both the first DTE and first remote DTE, providing a relationship between each of the set of n different independent digital communication channels and the chronologic order of its establishment during the initialization phase.

3. Method according to claim 2 characterized in that said first initialization frame includes in a first synchronization byte located between two HDLC or SDLC flags.

4. Method according to claim 3 characterized in that said second initialization frame consists in a second synchronization byte which is located between two HDLC or SDLC flags.

5. Method according to claim 4 characterized in that said third initialization frame consists in a third synchronization byte which is located between two HDLC or SDLC flags.

6. Method according to claim 5 characterized in that said fourth initialization frame consists in a fourth synchronization byte which is located between two HDLC or SDLC flags.

7. Method according to anyone of claims 1 to 6 characterized in that it is applied to an ISDN, a fractional T1 or a multi-channel E1 digital network in order to provide multiple digital links operating at n times 64 kbps.

8. Apparatus for connecting a data terminal equipment DTE to a digital communication network which provides multiple independent communication channels, said apparatus includes:

a transmit part including means for establishing, on request of a first DTE to a first remote DTE, a set a n independent digital communication channels between said first DTE and said remote DTE;

memory storage (160) for storing data to be transmitted and to be received through said set of n independent digital communication channels, means for determining, during an initialization phase, the relationship between the slot of each of the set of n independent digital communication channels used for building of an aggregation superchannel and the chronologic order of the establishment of said each set of n independent digital communication channels;

said transmit part further comprising means (100, 1010, 1160, 1500) for transmitting each byte of a high rate data flow through said set of n independent digital communication channels in accordance with the chronologic order assigned to each of said set of n independent digital communications channels (1500);

a receiving part comprising means for storing in said memory storage each byte of a splitted high-rate data flow received from each of said set of n independent digital communication channels at an address which is computed in accordance with the formula:

$$A(n)=A(n-1)+n$$

Where $A(n-1)$ corresponds to the address in which a preceding byte conveyed through one of said set of n independent digital communication channels is stored, and n corresponds to the number of digital channels established.

9. Apparatus according to claim 8 characterized in that the DTE includes an ISDN primary terminal adapter and the multiple independent communications channels operating at n times 64 kbps, with n being an integer greater than 1.

10. In a digital communication network for transmitting digital data between a first Data Terminal Equipment DTE and a first remote DTE wherein the first DTE and the first remote DTE are separated by n separate independent digital communication channels, with n being an integer greater than 1 and each one of the n separate independent digital communication channels being operated at a first data rate, a device for forming a single high-rate digital channel operating at n x the first data rate comprising:

- a first means, on request of the first DTE to the first remote DTE, for establishing a set of the n separate independent digital communication channels to be used in forming the single high-rate digital channel;
- a second means for determining, during an initialization phase, the relationship between the slot of each one in the set of the n separate independent digital communication channels and the chronological order in which the slot was being established;
- a third means for separating a high speed data flow into a plurality of predetermined data units;
- and a fourth means for transmitting each one of the plurality of predetermined data units through said each one in the set of the n separate independent digital communication channels in accordance with the chronological order which was previously assigned to said each one in the set of the n-separate independent digital communication channels.

11. The device of claim 10 wherein each one of the plurality of predetermined units is equivalent to a data byte.

12. The device of claim 11 further including

- a memory means for storing the high speed data flow to be transmitted through and to be received from the n separate independent digital communication channels; and
- a fifth means for receiving the data bytes from a selected group of the n separate independent digital communication channels and storing each byte at selected address in said memory means so that a high rate data flow received from the selected group of the n separate communication channels are being stored at contiguous memory locations.

13. The device of claim 12 wherein the memory address for each byte is computed from the expression:

$$A(n) = A(n-1) + n$$

Where $A(n-1)$ represents the address in which a preceding byte, received from one of the selected group of the n separate independent digital communication channels, has been stored and n represents the number of separate independent digital communications channels established.

* * * * *